US012445575B2

(12) United States Patent
Asgekar et al.

(10) Patent No.: US 12,445,575 B2
(45) Date of Patent: Oct. 14, 2025

(54) OBSERVATION OF PARALLEL VIDEO COLLABORATION SESSIONS

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

( * ) Notice: Subject to any disclaimer, the term of this patent is extended or adjusted under 35 U.S.C. 154(b) by 261 days.

(21) Appl. No.: 17/984,149

(22) Filed: Nov. 9, 2022

(65) Prior Publication Data

US 2023/0143579 A1    May 11, 2023

Related U.S. Application Data

(60) Provisional application No. 63/278,063, filed on Nov. 10, 2021.

(51) Int. Cl.
| | | |
|---|---|---|
| *H04N 7/15* | (2006.01) | |
| *H04L 9/08* | (2006.01) | |
| *H04L 9/32* | (2006.01) | |
| *H04L 12/18* | (2006.01) | |

(52) U.S. Cl.
CPC ........... *H04N 7/152* (2013.01); *H04L 9/0833* (2013.01); *H04L 9/3213* (2013.01); *H04L 9/3236* (2013.01); *H04L 12/1822* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 11,463,492 | B1* | 10/2022 | Swerdlow | ........... H04L 12/1822 |
| 2010/0150139 | A1* | 6/2010 | Lawson | ............... H04M 15/44 |
| | | | | 370/352 |
| 2019/0013956 | A1* | 1/2019 | Soneda | .................. H04W 12/06 |
| 2020/0403780 | A1* | 12/2020 | Ståhl | ..................... H04L 63/062 |
| 2022/0086393 | A1* | 3/2022 | Peters | ..................... H04N 7/147 |
| 2023/0412762 | A1* | 12/2023 | Goldstein | ............... H04N 7/15 |
| 2024/0048385 | A1* | 2/2024 | Prest | ..................... H04L 9/0833 |

* cited by examiner

*Primary Examiner* — Quoc D Tran
(74) *Attorney, Agent, or Firm* — Pierson Ferdinand LLP; Daniel Rose

(57) ABSTRACT

The present disclosure provides systems and methods for managed video conferencing. A system can include a media server comprising a processor, a network interface in communication with a plurality of client devices, and a memory storing a cryptographic key shared with an access control server. The system can receive, from a first client device via the network interface, metadata of a video conferencing session and a token, the token provided to the first client device by the access control server responsive to successful registration of the first client device for the video conferencing session. The system can calculate a hash of the metadata with the cryptographic key. The system can compare the calculated hash to the token. The system can, responsive to the calculated hash matching the token, provide at least one media stream of the video conferencing session to the first client device. Such a stream may be provided to the first client device regardless of what other devices are configured to receive the stream or receive other streams within the system.

18 Claims, 10 Drawing Sheets

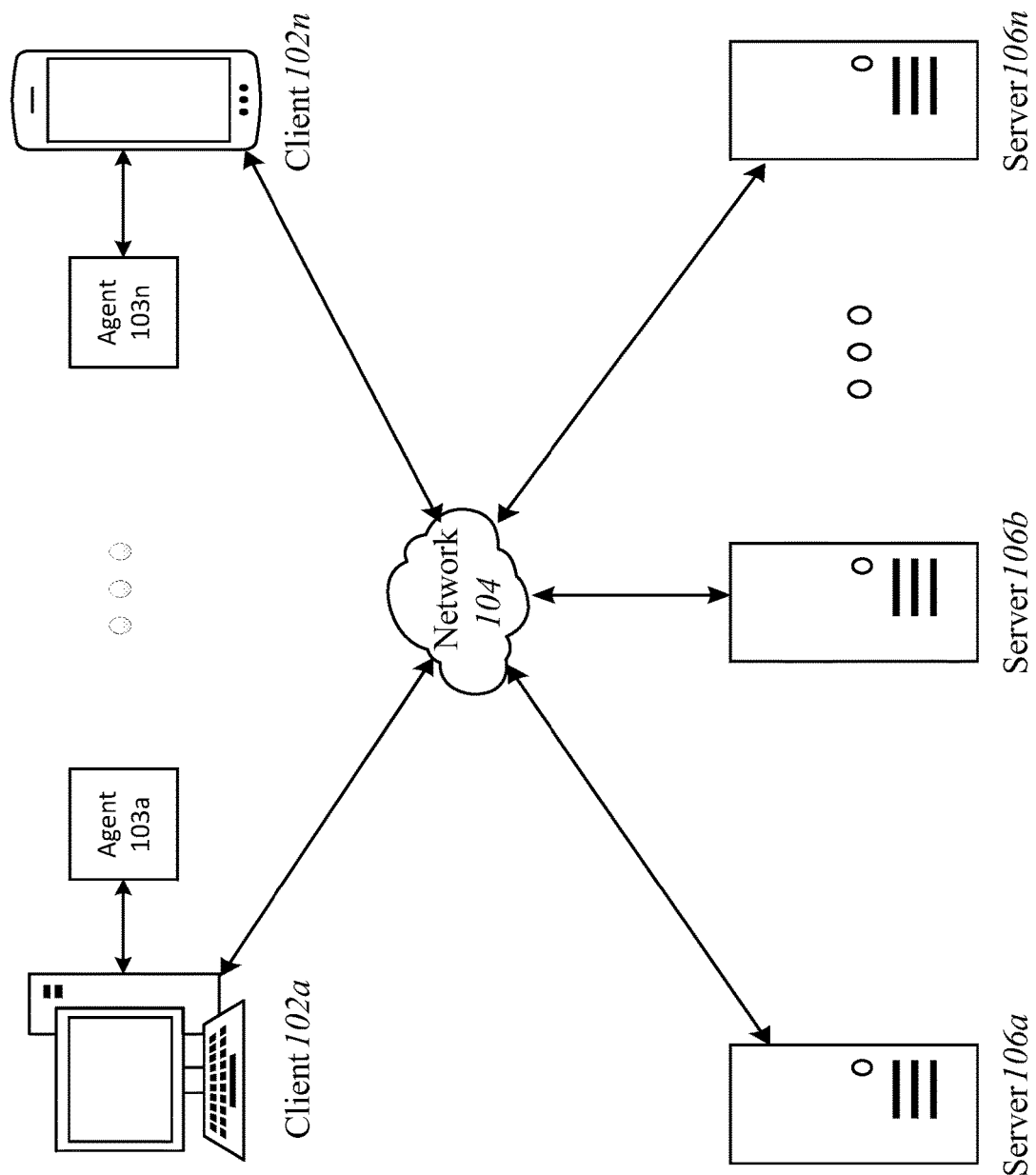

OBSERVATION OF PARALLEL VIDEO COLLABORATION SESSIONS

RELATED APPLICATIONS

This application claims the benefit of and priority to U.S. Provisional Patent Application No. 63/278,063, entitled "Observation of Parallel Video Collaboration Sessions," filed Nov. 10, 2021, the entirety of which is incorporated by reference herein.

BACKGROUND

Educators can use a video collaboration tool to communicate with one or more participants or groups of participants. The educators can provide lectures or enhance online learning experiences using the video collaboration tool. However, to fully observe a video session, educators and participants alike are required to be in the session.

SUMMARY

Video collaboration tools can provide communications between educators and students. Conventionally, users (e.g., educators, students, or administrators) can observe a session by being in the session themselves. However, these conventional collaboration tools are cumbersome for managing different types/groups of participants. For example, these conventional collaboration tools may limit educators from multitasking across multiple parallel sessions of different groups of participants. Furthermore, conventional collaboration tools do not provide a capacity for a moderator or authority figure to observe activities in multiple on-going sessions simultaneously, hence, requiring the moderator to manually move between each session (as a participant) and interact with other participants in the session to observe the lecture or classroom environment.

The systems and methods of this technical solution provide "breakout rooms" (e.g., mini-conference sessions) that allow a video chat host (e.g., moderator, educator, or session creator) to separate participants into multiple "breakout" groups. The systems and methods can enable the host, moderator, or administrator to view video or audio from any or all groups simultaneously while either in a group or from outside all groups. For example, the host can participate in a group or exist undetected outside the groups or sessions. The host can observe videos from any group simultaneously with or without being a participant within the session. The host can observe both audio and video with or without being in the group. Participants in each breakout group may not interact with other participants in a different breakout group.

The systems and methods can provide a different architecture for routing video or audio stream and intelligently manipulate data transmission based on at least one of the host being active in a breakout group, host observing a breakout without showing that the host is a participant in the session or based on a number of breakout groups being run or observed in parallel within an application. Thus, by separating out different feeds for each session and multiplexing them dynamically, the systems and methods described herein can enable hosts or moderators to observe a group or video collaboration, observe video from parallel breakout groups simultaneously, or listen to audio from any group, all as an undetected observer or while actively participating in a single breakout group. Further, the systems and methods can enable the hosts or moderators to be automatically alerted based on visual cues from at least one breakout group which they may not be a participant via analysis of the video feed on the respective host user interface.

At least one aspect of the present disclosure is directed to a method for managed video conferencing. The method can be performed, for example, by a media server comprising one or more processors and memory. The method can include receiving, by a media server from a first client device, metadata of a video conferencing session and a token, the token provided to the first client device by an access control server responsive to successful registration of the first client device for the video conferencing session. The method can include calculating a hash, by the media server, of the metadata with a cryptographic key shared with the access control server. The method can include comparing, by the media server, the calculated hash to the token. The method can include, providing at least one media stream of the video conferencing session to the first client device responsive to the calculated hash matching the token.

The method can include identifying, by the media server from the metadata, a first subgroup of a plurality of client devices as including the first client device. The method can include receiving, by the media server from a second client device, a first media stream. The method can include forwarding, by the media server, the first media stream to the first client device, responsive to the identification of the first subgroup as including the first client device. The method can include identifying, by the media server from metadata received from a third client device, the first subgroup as including the third client device. The method can include forwarding, by the media server, the first media stream to the third client device, responsive to the identification of the first subgroup as including the third client device. In some cases, the media server can receive a media stream from each of the first client device and the third client device, and may not forward the media stream from each of the first client device and the third client device to the other of the first client device and the third client device.

The method can include forwarding, by the media server, a media stream from each of the first client device and the third client device to the second client device, responsive to an identification of the second client device as included in a second subgroup of the plurality of client devices. The method can include receiving, by the media server from the second client device, a command to reject the media stream from the first client device. The method can include, responsive to receipt of the command to reject the media stream from the first client device, transmitting, by the media server to the first client device, a command to stop transmitting the media stream. In some cases, at least one of the media streams from the first client device and the third client device may not include a video.

The method can include forwarding, to the first client device, a subset of media streams received by the media server. The subset can include a media stream received from a second device and may not include a media stream received from the first client device. In some cases, the subset may not include a second media stream received from a third client device, and the method can include providing a second subset of media streams to the third client device, the second subset including the media stream received from the second device and the media stream received from the first client device. In some cases, the first client device may not have access to the cryptographic key.

At least one other aspect of the present disclosure is directed to a system for managed video conferencing. The system can include a media server including one or more processors, a network interface in communication with client devices, and a memory storing a cryptographic key shared with an access control server. The system can receive, from a first client device via the network interface, metadata of a video conferencing session and a token, the token provided to the first client device by the access control server responsive to successful registration of the first client device for the video conferencing session. The system can calculate a hash of the metadata with the cryptographic key. The system can compare the calculated hash to the token. The system can provide at least one media stream of the video conferencing session to the first client device responsive to the calculated hash matching the token.

The system can identify, from the metadata, a first subgroup of the plurality of client devices as including the first client device. The system can receive, via the network interface from a second client device, a first media stream. The system can forward, via the network interface, the first media stream to the first client device, responsive to the identification of the first subgroup as including the first client device. The system can identify, from metadata received from a third client device, the first subgroup as including the third client device. The system can forward the first media stream to the third client device, responsive to the identification of the first subgroup as including the third client device. In some cases, the media server can receive a media stream from each of the first client device and the third client device, and may not forward the media stream from each of the first client device and the third client device to the other of the first client device and the third client device.

The system can forward a media stream from each of the first client device and the third client device to the second client device, responsive to an identification of the second client device as included in a second subgroup of the plurality of client devices. The system can receive, via the network interface from the second client device, a command to reject the media stream from the first client device. The system can, responsive to receipt of the command to reject the media stream from the first client device, transmit, via the network interface to the first client device, a command to stop transmitting the media stream. In some cases, at least one of the media streams from the first client device and the third client device may not include a video.

The system can forward, to the first client device, a subset of media streams received by the media server. The subset can include a media stream received from a second device and may not include a media stream received from the first client device. In some cases, the subset may not include a second media stream received from a third client device. The system can provide a second subset of media streams to the third client device, the second subset including the media stream received from the second device and the media stream received from the first client device. In some cases, the first client device may have no access to the cryptographic key.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

DETAILED DESCRIPTION

Figure 1B:
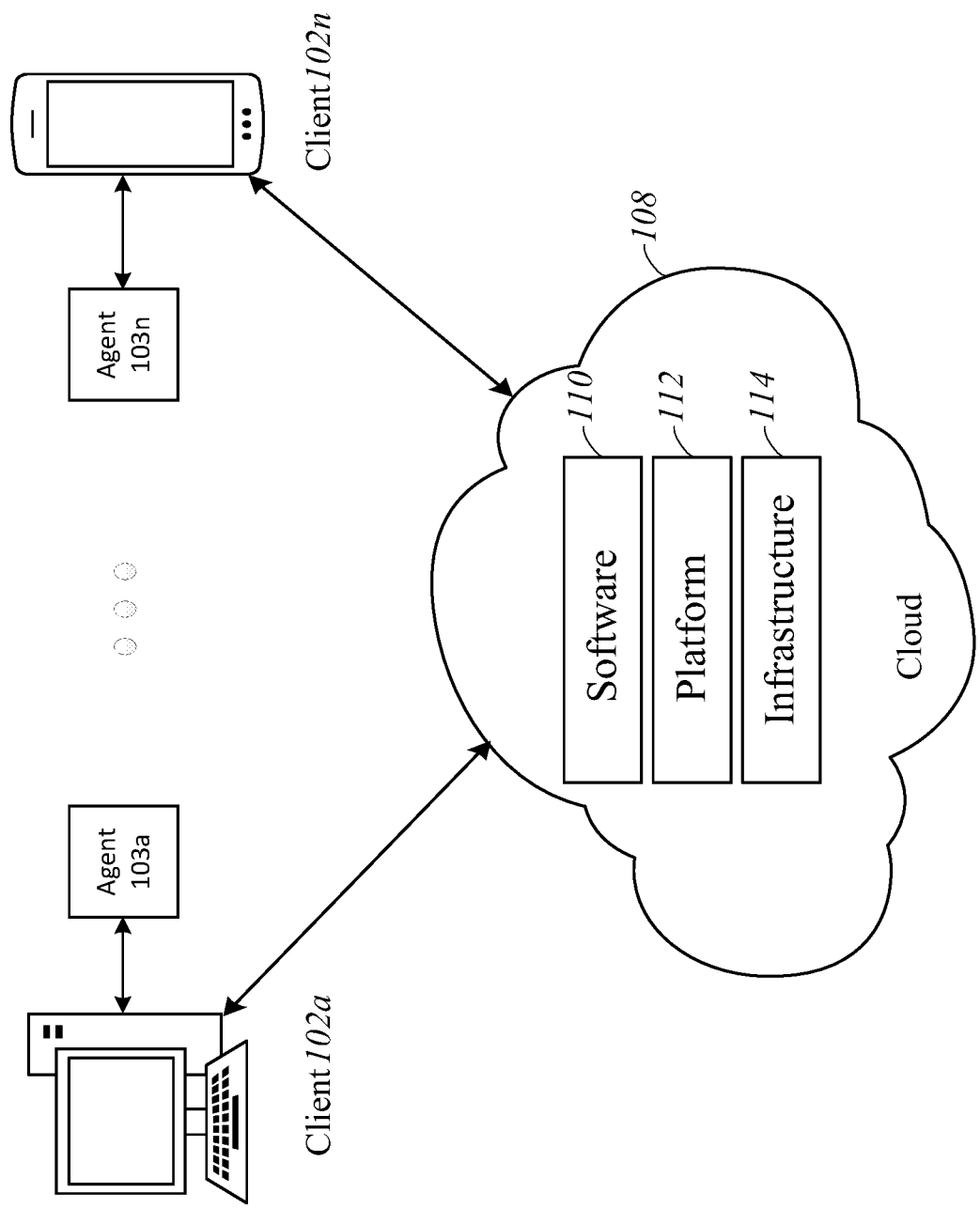
FIG. 1B is a block diagram depicting a cloud computing environment comprising a client device in communication with cloud service providers.

Below are detailed descriptions of various concepts related to, and implementations of, techniques, approaches, methods, apparatuses, and systems for managed video conferencing. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for managed video conferencing.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others.

Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
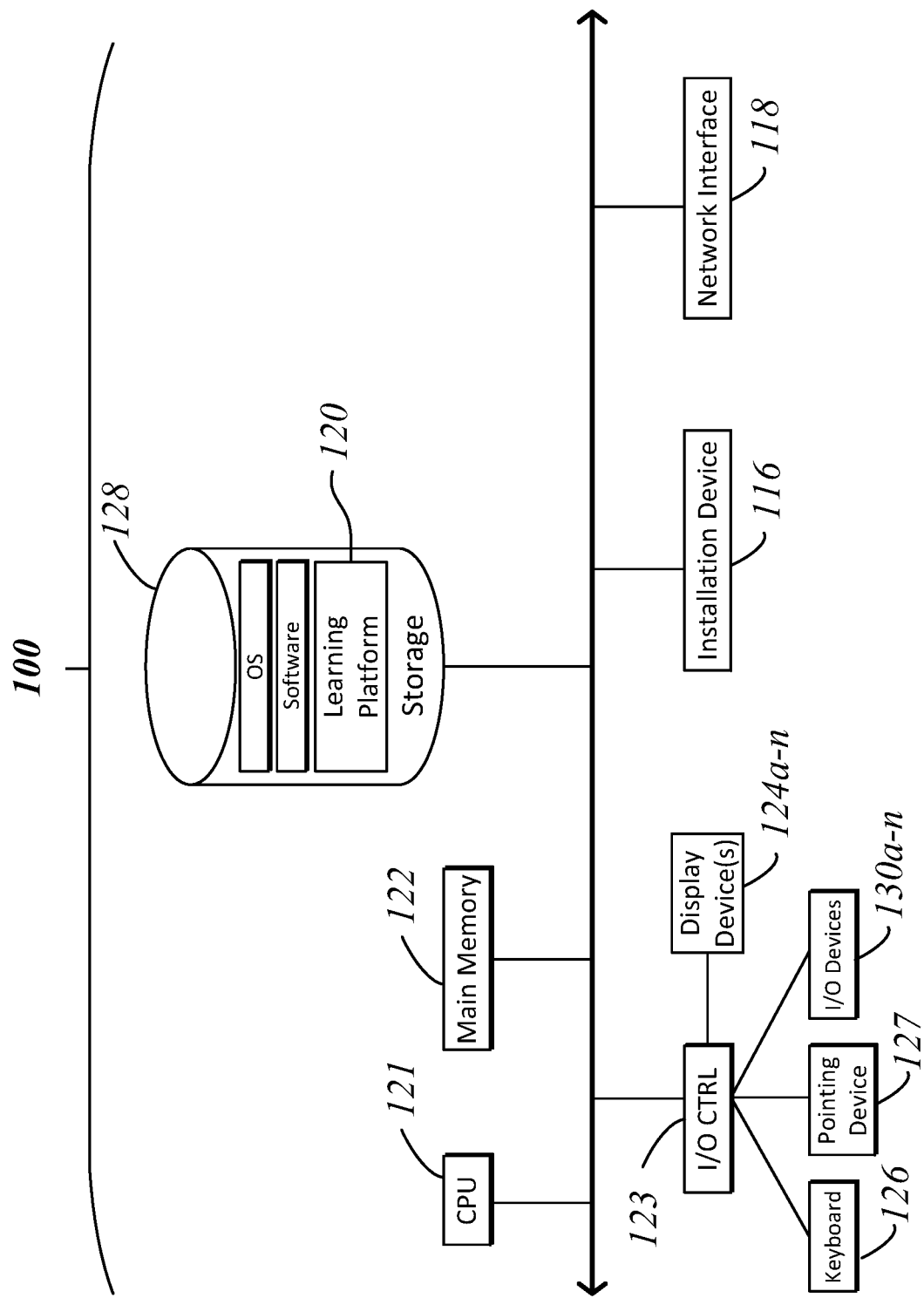
FIGS. 1C and 1D are block diagrams depicting embodiments of computing devices useful in connection with the methods and systems described herein.
Figure 1D:
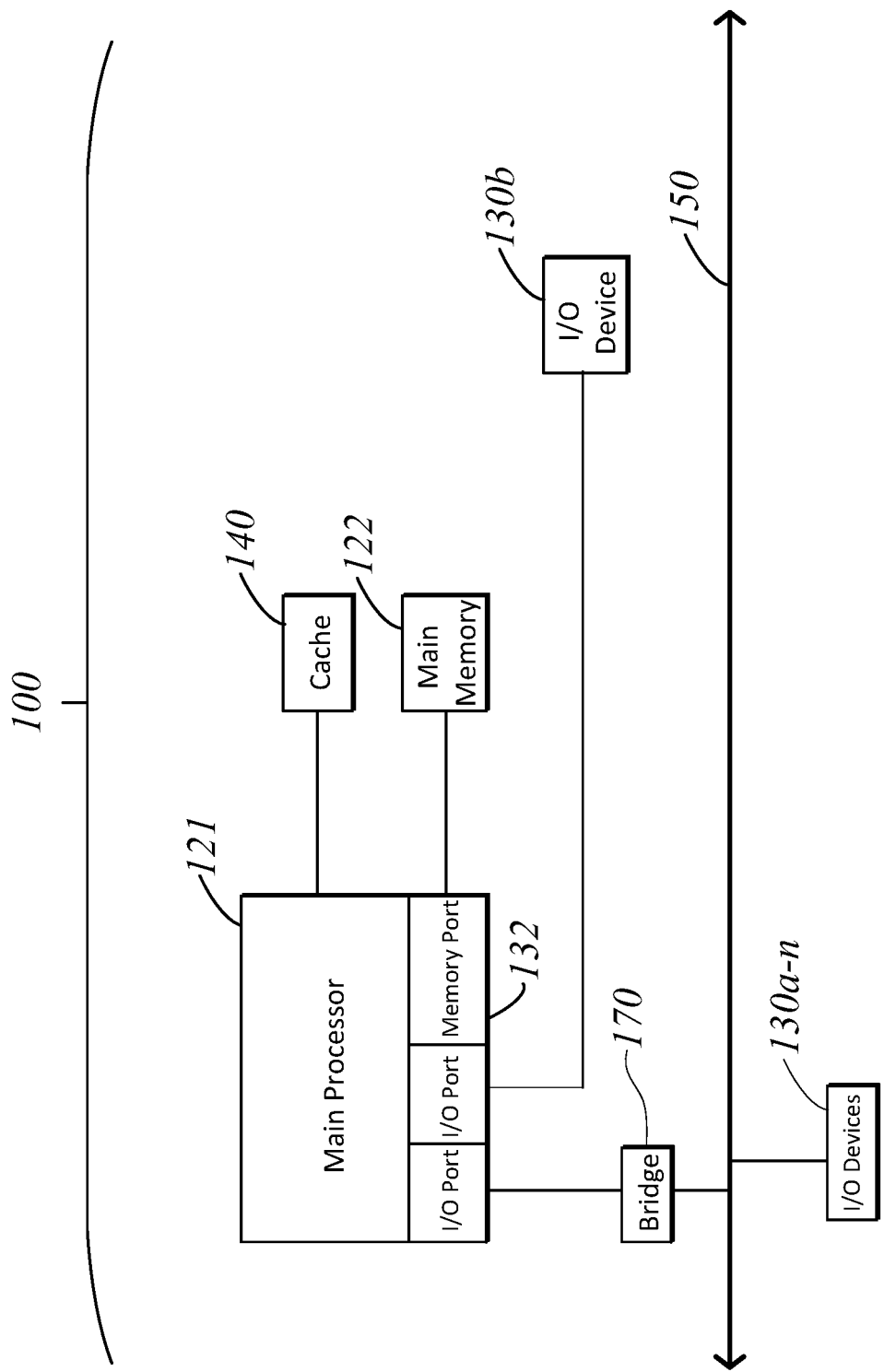

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or the NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Managing Video Conferencing Sessions

The systems and methods of this technical solution provide techniques for managing video conference sessions using breakout rooms. With the increasing usage of video collaboration tools, such as online learning platforms, video conferencing tools, among others, it becomes necessary for educators to multitask across multiple parallel on-going sessions (e.g., having different students in each session) and for moderators or authority figures to be able to observe activities across all sessions simultaneously without being a participant in the session or without interacting with one or more participants in the on-going session.

Using conventional video conference tools, a user needs to be a participant in a session to fully observe the session. For example, a user can join the session to share or receive video or audio feeds to participants, view screen share from other devices, among other content sharing features to or from an educator or other participants (e.g., classmates, users, students, etc.). Further, traditional Web Real-Time Communication ("WEBRTC") based video calling interfaces are built using two models. These models can include Multipoint Conferencing Unit ("MCU") design which can include the server performing heavy workload by reencoding the streams and Selective Forwarding Unit ("SFU") design which the server can selectively forwards specific streams to different users at different bitrates. However, neither of these models treats users differently, such as accounting for different types or categories of users with different video/audio feed sharing configurations. For example, the models fall short if a product needs 4 users to be in full-duplex mode, with the 4 users broadcasting their streams to all other participants, with another 10 users that can only send their video feeds out without receiving return feeds (e.g. "broadcast-only"), and some arbitrary "x" number of special users who only receive feeds but do not broadcast anything (e.g. "receive-only"). In other words, the models do not account for an arbitrary number of participants in different groups, with each group having their respective content sharing or consumption permission within a session.

Additionally, the problem with traditional WEBRTC is exacerbated, for example, if these groups of users need access to feeds from multiple ongoing parallel video calls simultaneously. Apart from video and audio streams, one or more parallel sessions can be in collaborative whiteboard sessions (e.g., supervised by an educator) that should be parallelized. The whiteboard can be an online page on which users can digitally draw or text. The whiteboard can include fixed texts or images configurable by the device of the session host. Therefore, the systems and methods of this technical solution provide breakout rooms for separating different feeds for each of the sessions and multiplexing the feeds dynamically to the configuration of the hosts or moderators (e.g., multiplexing feeds from breakout rooms for consumption by the educator device). With breakout rooms, each student can participate in one session at a time to consume all incoming streams and read/write on a digital whiteboard, while teachers can multitask across multiple parallel sessions to transmit the streams and receive incoming whiteboard feeds from users in all on-going sessions. Further, an administrator can access all on-going breakout sessions within an institution to consume any audio/video/whiteboard feeds from the sessions. For passing around audio/video/screen share streams, the systems and methods can leverage the Application Programming Interface ("API") of WEBRTC to obtain media streams from each user. The systems and methods can sanitize the streams (e.g., animated, machine learning transformed, background blur, etc.) and send the streams to an SFU based backend server. The SFU based backend server discussed herein differs from the traditional model of the WEBRTC in that this SFU can depend on additional permissioning logic before transmitting streams to one or more participants. The systems and methods can use Scalable Video Coding ("SVC") to provide a video or screen sharing feed with resolutions associated with a display device of the user.

The systems and methods can perform the discussed features herein using a different architecture for routing video or audio stream and intelligently manipulate data transmission based on at least one of the host being active in a breakout group, host observing a breakout without showing that the host is a participant in the session or based on a number of breakout groups being run or observed in parallel within an application. For example, while a breakout group may be considered a session or 'room' of participants, the media stream and/or combined media streams from group participants may be sent to a participant that does not provide a media stream to the group (e.g. an administrator or moderator 'outside' of the room). Thus, in view of at least the aforementioned and as discussed herein, the systems and methods of this technical solution can provide improved video collaboration tools that enable hosts/moderators to observe a group or video collaboration, observe video from parallel breakout groups simultaneously, and/or listen to audio from any group as an undetected observer or while actively participating in a single breakout group (for example, a moderator may receive a media stream including video and/or audio from a breakout group undetected to participants in the group or while 'outside of the room'). Further, the systems and methods can automatically alert hosts/moderators based on visual cues from breakout groups in which they are not a participant through analysis for one or more video feeds.

Figure 2:
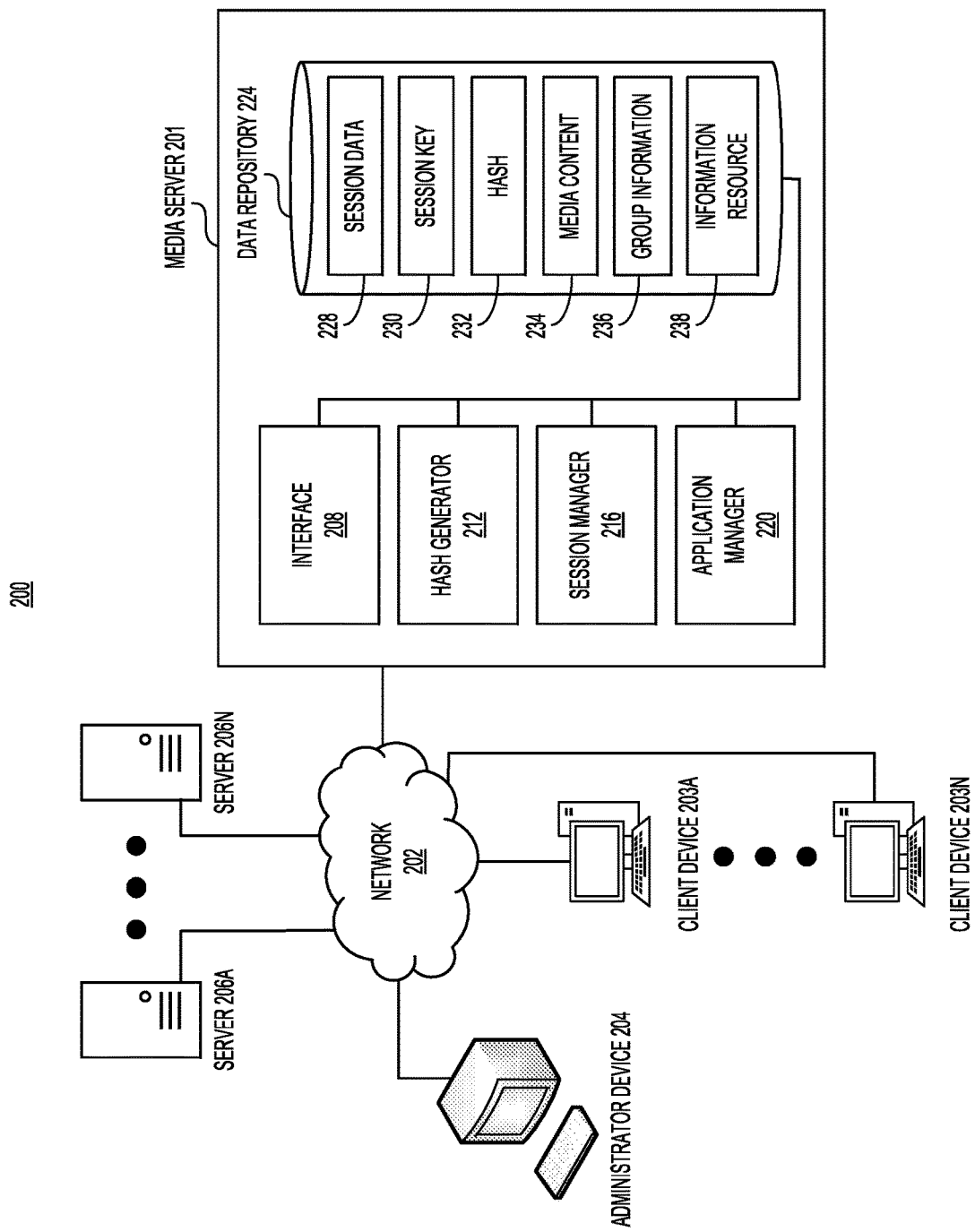
FIG. 2 is a block diagram of an example system for managing video conference with breakout rooms, in accordance with one or more implementations.

Referring now to FIG. 2, a block diagram of an example system for managing video conferences with breakout rooms is shown, in accordance with one or more implementations. The system 200 can include at least one media server 201 (e.g., data processing system or selective forwarding unit ("SFU") for managing breakout rooms), at least one network 202, one or more client devices 203A-N (sometimes generally referred to as client device(s) 203), at least one administrator device 204, and one or more servers 206A-N (sometimes generally referred to as server(s) 206). The one or more components of the system 200 (e.g., the media server 201, the network 202, the client device 203, the administrator device 204, or the server 206), or one or more components of the media server 201 (e.g., interface 208, hash generator 212, session manager 216, application manager 220, or data repository 224) can perform, execute, or otherwise carry out features and functionalities of the systems and methods described herein, such as in FIG. 1 and FIGS. 3-7.

Each of the components (e.g., the media server 201, the network 202, the client devices 203, the administrator device 204, or the servers 206) of the system 200 can be implemented using the hardware components or a combination of software with the hardware components of a computing system, such as the computing system 100 detailed herein in conjunction with FIGS. 1A-1D, or any other computing system described herein. Each of the components of the media server 201 can perform any of the functionalities detailed herein.

The network 202 can include computer networks such as the Internet, local, wide, metro or other area networks, intranets, satellite networks, other computer networks such as voice or data mobile phone communication networks, and combinations thereof. The media server 201 of the system 200 can communicate via the network 202, for example, with one or more client devices 203, the administrator devices 204, or the servers 206. The network 202 may be any form of computer network that can relay information between the media server 201, the one or more client devices 203, and one or more information sources, such as web servers or external databases, amongst others. In some implementations, the network 202 may include the Internet and/or other types of data networks, such as a local area network (LAN), a wide area network (WAN), a cellular network, a satellite network, or other types of data networks. The network 202 may also include any number of computing devices (e.g., computers, servers, routers, network switches, etc.) that are configured to receive and/or transmit data within the network 202. The network 202 may further include any number of hardwired and/or wireless connections. Any or all of the computing devices described herein (e.g., the media server 201, the one or more client devices 203, the administrator device 204, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 202. Any or all of the computing devices described herein (e.g., the media server 201, the one or more client devices 203, the administrator device 204, the computer system 100, etc.) may also communicate wirelessly with the computing devices of the network 202 via a proxy device (e.g., a router, network switch, or gateway). In some implementations, the network 202 can be similar to or can include the network 104 or the cloud 108 described herein above in conjunction with FIGS. 1A and 1B.

Each of the client devices 203 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 203 can include one or more computing devices or servers that can perform various functions as described herein. The one or more client devices 203 can include any or all of the components and perform any or all of the functions of the computer system 100 described herein in conjunction with FIGS. 1A-1D. The client devices 203 can be, or can be similar to, the client devices 102 described herein above in conjunction with FIGS. 1A-1D.

Each client device 203 can include, but is not limited to, a television device, a mobile device, smart phone, personal computer, a laptop, a gaming device, a kiosk, or any other type of computing device. Each client device 203 can be implemented using hardware or a combination of software and hardware. Each client device 203 can include a display device that can provide visual information, such as information presented as a result of executing instructions stored in the memory of the client device 203. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as a capacitive or resistive touch sensor. Thus, the display device can be an interactive display (e.g., a touchscreen, a display, etc.), and can include one or more input/output (I/O) devices or interfaces. Each client device 203 can further include or be in communication with (e.g., via a communications bus coupled to the processors of the client devices 203, etc.) one or more input devices, such as a mouse, a keyboard, or digital key pad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 203. The interactions can result in interaction data, which can be stored and transmitted by the processing circuitry of the client device 203 to other computing devices, such as those in communication with the client devices 203.

The interaction data can include, for example, interaction coordinates, an interaction type (e.g., click, swipe, scroll, tap, etc.), and an indication of an actionable object with which the interaction occurred. Thus, each client device 203 can enable a user to interact with and/or select one or more actionable objects presented as part of graphical user interfaces to carry out various functionalities as described herein.

The client devices 203 can each execute one or more client applications, which can be a web browser or native application that presents educational content provided or managed by the media server 201. The one or more client applications can cause the display device of one or more client devices 203 to present a user interface that includes educational content, such as presentation slides, word documents, online questions, or electronic textbooks, among others. The application can be a web application (e.g., provided by the media server 201 or other servers 206 via the network 202, etc.), a native application, an operating system resource, or some other form of executable instructions. In some implementations, the client application can include a local application (e.g., local to a client device 203), hosted application, Software as a Service (SaaS) application, virtual application, mobile application, and other forms of content. In some implementations, the application can include or correspond to applications provided by remote servers or third-party servers. In some cases, the application can access a session managed by the media server 201 or other servers 206, and generate a user interface that displays real-time information from the session on the display device of the client device 203 on which the client application is executing. In some cases, the application can access multiple parallel on-going sessions based on the permission assigned to at least one of the client devices 203, e.g., if the user is an educator or host of the sessions.

In embodiments, one or more client devices 203 can establish one or more communication sessions with the media server 201, such as video or audio communications for broadcasting or consuming contents. The one or more communication sessions can each include an application session (e.g., virtual application), a video conferencing session, an execution session, a desktop session, a hosted desktop session, a terminal services session, a browser session, a remote desktop session, a URL session and/or a remote application session. Each communication session can include encrypted and/or secure sessions, which can include an encrypted file, encrypted data, or traffic. The client devices 203 can access one or more communication sessions by registering for the sessions, verifying the identity of the client devices 203, or matching tokens signed with encrypted keys between different servers.

Each of the client devices 203 can be computing devices configured to communicate via the network 202 to access a session managed by the media server 201, such as video conference session via a web browser, or application resources via a native application executing on a client device 203. Once accessed, the client device 203 can execute instructions (e.g., embedded in the native applications, or a script in the information resources 238, etc.) that cause the client devices to display educational content, which can include images, video, audio, quiz or exam questions, practice questions, or other types of educational content within a session. For example, the client device 203 can display contents shared or streamed within a session. In some cases, the client device 203 can broadcast the content to the session, e.g., with host privilege. As described herein, the client device 203 can register for a session and receive one or more responses that include access to the session subsequent to confirming the permission with the media server 201 or one or more other servers 206. The session can include a video/audio/screen sharing feed for the client device 203 to consume. In cases where the client device 203 is the host of the session or other parallel sessions, the client device 203 can provide the video/audio/screen sharing feeds to other participants within the session. In some cases, the client device 203 can transmit other information, such as account information (e.g., changing account parameters, changing login information, etc.), interaction information, selections of question answers, provided answers to questions, selections of topics, categories, or lesson-based information, or other signals to the media server 201.

The administrator device 204 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The administrator device 204 can include one or more computing devices or servers that can perform various functions as described herein. The administrator device 204 can include any or all of the components and perform any or all of the functions of the computer system 100 described herein in conjunction with FIGS. 1A-1D. The administrator device 204 can be, or can be similar to, the client devices 102 described herein above in conjunction with FIGS. 1A-1D. To distinguish between different types of users using the client devices 203, a client device 203 used by an educator can be referred to as an educator device, and another client device 203 used by a student can be referred to as a student device.

The administrator device 204 can be similar to one or more of the client devices 203 described above and can include any of the hardware components of the client devices 203, as well as perform any of the functionalities of the client devices 203 as described herein. The administrator device 204 can be equipped with different privileges or access permission than one or more of the client devices 203. For example, educators or hosts using a first subset of the one or more client devices 203 can create or generate multiple parallel sessions (e.g., breakout sessions). The educators can hop between their respective parallel sessions to actively receive the audio, video, or screen share feeds, while continuing to receive incoming whiteboard feeds from their respective on-going sessions. In some cases, the educators can access other on-going sessions that other educators created. The students using a second subset of one or more client devices 203 can access their respective registered/assigned sessions to enter a lecture or a classroom managed by the educators. Each student can join a single session and can consume incoming streams from the session with full-duplex capabilities for the whiteboard. The administrator device 204 can access all on-going sessions within an institution, e.g., managed by educators within the institution. The administrator device 204 can consume all video, audio, and screen share feeds with or without being a participant of the session (e.g., involved observation or hidden observation). The administrator device 204 may not have access to broadcast while having full access to consume feeds broadcasting in any session. Therefore, although the administrator device 204 can perform features and functionalities similar to the client devices 203, the media server 201 can enforce different permission or access permission to the administrator device 204 than the client devices 203.

With different permission or privileges, one or more client devices 203 or the administrator device 204 can be presented with varying user interfaces presented on the display device of each device. For example, students of the one or more devices 203 can view frames (e.g., images, icons, or visual information) of a single session, educators of other one or more devices 203 can view the frames of the session along with other parallel on-going sessions with other students, and an administrator using the administrator device 204 can view various frames of all on-going sessions within an institution. While scrolling through sessions respectively available given the permission of the educators or administrator, the educators or administrators can interact with a frame of a session to receive full audio, video, or screen share feeds from the session. In some cases, the video or screen share feed can be illustrated in the user interface of the one or more client device 203 or the administrator device 204 prior to interacting with a frame associated with a session. In some cases, the frame can be a snapshot of a session received during a refresh of the client device 203 or the administrator device 204. The display device of the client device 203 or the administrator device 204 can display multiple frames in the user interface of the application executing the sessions.

The server 206 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The server 206 can include any or all of the components and perform any or all of the functions of computer system 100 described herein in conjunction with FIGS. 1A-1D. The server 206 can be, or can be similar to, the server 106 described herein above in conjunction with FIGS. 1A-1D.

The server 206 can connect to the media server 201, the client device 203, or the administrator device 204 via the network 202. Each server 206 can include, but is not limited to an API server (e.g., access control server), a real-time server, among other types of servers to authenticate session access request, verify session access, or transmit breakout sessions for the devices within the system 200. For example, the API server can fetch or transmit session information to users that have permission to access the session. The API server can verify the identity of the client device 203 by performing a lookup within a database storing a record of users that are permitted to access a session and metadata of the session. The server 206 can operate remotely from other devices within the system 200, such as the media server 201, the client device 203, or the administrator device 204. In some cases, the server 206 can include one or more components, features, and functionalities of the media server 206. For example, the server 206 can receive tasks delegated from the media server 201, such as processing user information to determine user identity, managing one or more breakout sessions (e.g., generating, maintaining, or updating sessions), or acting as an intermediary device to deliver feeds between client devices 203 or administrator device 204.

The one or more servers 206 can perform various tasks to manage video conference sessions including at least data distribution from at least one of the client devices 203 to other client devices 203 or the administrator device 204. In some cases, the servers 206 can include features and functionalities that are a part of the media server 201. The servers 206 can communicate with the media server 201 to exchange data or information (e.g., between a database of the server 206 and the data repository 224 of the media server 201), forward data from other components of the system 200, or transmit or receive processed information. For example, a server 206 can receive audio or video packets from an educator device to present to other users within a session. The server 206 can distribute or transmit the audio or video packets to one or more student devices in the session or the administrator device 204 participating in or exist undetected outside the session. The server 206 can share a secret key with another server 206 or the media server 201 to either accept or reject a session registration request from a client device 203. For example, the API server can receive a request from a client device 203 to register a session (e.g., arbitrary session "x"). The API server can perform a lookup in a database (e.g., a remote database on the server 206) to determine users with permission to access session x. The API server can retrieve session x metadata from the database. If the API server determines that the client device 203 has permission to access session x, the API can transmit the metadata with a signed secret key to the client device 203. Otherwise, the API can reject the request and provide a notification to the client device 203 that the user lacks permission to register for session x. The transmitted metadata with a signed secret key can be referred to as a session token. The session token can be used by the media server 201 to compare with a second token generated by the media server 201 based on the transmitted metadata and signed with a key stored in the data repository 224, for example.

The server 206 can provide session updates to client devices 203 within a session (e.g., a breakout session). For example, the API server can receive a request from the client device 203 to fetch sessions for the user of the client device 203 (e.g., arbitrary user "x"). The API server can transmit session identifiers and tokens of the sessions to the client device 203. The real-time server can receive a registration request for the sessions with the tokens forwarded from the API server. The real-time server can provide an acknowledgment to the client device 203 to confirm receipt of the registration request. The real-time server can fetch session information upon request for a respective session of various sessions. The real-time server can provide updates to one or more client devices 203 upon receiving session updates (e.g., updates to the whiteboard of the session) from at least one of the client devices 203. For example, the real-time server can receive a session update (e.g., first session update) from a first client device. Responsive to receiving the first session update, the real-time server can forward the updated information or the updated session to a second client device, among other client devices 203 within the same session. Similarly, if the real-time server receives a session update (e.g., second session update) from the second client device or other client devices 203, the real-time server can forward the updated information or session to the first client device.

The features of the server 206 described above can be performed on multiple parallel sessions (e.g., breakout sessions) and support multiple devices, such as the client devices 203 or the administrator device 204. Thus, the server 206 can provide updates (e.g., whiteboard updates or audio, video, or screen share feeds) to individual devices within a session or breakout session which enables educators to observe video from all breakout groups simultaneously. One or more features and functionalities of the server 206 can be performed by the media server 201, as described herein. In some cases, one or more servers 206 can be a part of the media server 201, such that the features and functionalities of the server 206 can be performed by one or more components of the media server 201.

The media server 201 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The media server 201 can include one or more computing devices or servers that can perform various functions as described herein. The media server 201 can include any or all of the components and perform any or all of the functions of the computer system 100 described herein in conjunction with FIGS. 1A-1D. The media server 201 can include components and perform any or all of the features and functionalities of at least one server 206.

The media server 201 can be connected to other devices or components within the system 200 via the network 202. The media server 201 can transmit or receive data (e.g., information or data packets) to or from the client device 203, the administrator device 204, or the server 206. The media server 201 can process information from other components or devices within the system 200. The media server 201 can transmit processed information to, for example, the client device 203, the administrator device 204, or the server 206. The media server 201 can transmit data to at least one of the servers 206 for processing (e.g., delegating tasks or loads to other servers 206). The media server 201 can manage feeds from multiple sessions, for example, by separating different feeds from each session and multiplexing the feeds dynamically for distribution to users with appropriate access. Therefore, students can access a single session, teachers can access parallel on-going sessions (e.g., sessions created or being hosted by the teacher), and an administrator can access all on-going sessions to observe lectures and classrooms with or without being a participant in the sessions.

The media server 201 can include one or more hardware or software components, such as at least one interface 208, at least one hash generator 212, at least one session manager 216, at least one application manager 220, and at least one data repository 224. The data repository 224 can include data structures storing information to identify the identity of one or more users of the client devices 203 or the administrator device 204. The data repository 224 can be in electrical communication with or accessed by one or more components of the media server 201 (e.g., interface 208, hash generator 212, session manager 216, or application manager 220). The data repository 224 can include session data 228 (e.g., session data storage), session key 230 (e.g., session key data structure or session key storage), hash 232 (e.g., hash data structure or hash storage), media content 234 (e.g., media content data structure or media content storage), group information 236 (e.g., group information storage), or information resource 238 (e.g., information resource data structure or information resource storage).

The session data 228 can include, store, or maintain data (e.g., metadata) related to a session (e.g., breakout session). The data can include at least session identifier, session layout, interface in the session, devices connected to the session, whiteboard data (e.g., text or images fixed on the whiteboard) shown to users within a session, logs of activities performed by one or more client devices 203 including at least timestamps, pointer location, or mouse click, among other information to generate or update the session for users. The session data 228 can include, store, or maintain data related to other sessions within an institution. The session data 228 can be accessed or retrieved by one or more devices 203. Depending on the permission of the user associated with a client device 203, the client device 203 may be limited to access information on one session, can be limited to multiple sessions (e.g., such as sessions managed by an educator), or can be unrestricted to access session information of all sessions (e.g., with administrator device 204). For example, a student device can access information related to a session they were either assigned or registered for. The teacher device (e.g., device used by the teacher or the host of at least one session) can access information from multiple sessions, such as the sessions the teacher device registered for one or more participants. The administrator device 204 can access information from all sessions within an institution, such as all sessions hosted by multiple teachers.

In some cases, a teacher device can access session information from sessions managed by other teachers. In this case, the other teachers can provide access permission to the teacher device. For example, a first teacher device can hop to a session managed or hosted by a second teacher device, thereby accessing or retrieving session information from other sessions managed by other teacher devices. The session data 228 can store incoming or outgoing information associated with the session. For example, a client device 203 can provide an update to the session, including writing on a whiteboard or share screen in the session. The components within the media server 201 can retrieve and store the updated session data into the session data 228. The media server 201 can forward the updates to other users participating within the session, such as other client devices 203 or the administrator device 204 if the administrator is observing the session on the user interface displayed on the administrator device 204. When a new device joins the session, the media server 201 can provide the new device with the most updated session information, including configurations or settings changed by the host or any information provided on the whiteboard of the session.

The media server 201 can include a session key 230 data structure. The session key 230 data structure can include, store, or maintain a session key associated with each session. The session key can be a unique code, credential, identifier, password, secret key, or encrypted key associated with the session. The session key can be stored locally to the media server 201 or shared with other servers 206 within the system 200, such as an API server to verify and respond to the registration request from the client device 203. The session key can be generated upon generation of a session. For example, an educator device can transmit a request to register for or create a session that can hold a predetermined number of participants. The registered session can be assigned to the educator device or other devices with permission from the educator device. The session can be associated with a unique encrypted key shared between the media server 201 and at least one other server 206, such as the API server to confirm the identity of one or more devices registering for or accessing the session. In some cases, the limit to the number of participants within a session can be based on load handling or bandwidth available for the media server 201. In some cases, the number of participants can be limited by a number of devices with permission to access the session.

The session key can be stored in remote data storage in a server 206. For example, the server 206 can include a shared session key that is also stored in the session key 230 data structure. The server 206 can use the session key to digitally sign to a hash generated by one or more components of the server 206. The hash can be generated similar to one or more hashes stored in a hash 232 data structure. Once signed to the hash, the hash can be sent to the media server 201, where the hash is extracted and signed with the session key from the session key 230 data storage. The session key from the server 206 can be compared to the session key from the media server 201, for example. If matched, the media server 201 can determine that the client device 203 has permission to access or register for the session, thereby transmitting the session (e.g., breakout session) to the client device 203. Otherwise, the media server 201 can reject the registration request from the client device 203. The session key can be used for other verification purposes, including identifying the identity of users of client devices 203 or the administrator device 204 to determine permission for accessing one or more breakout sessions. The permission for each group of users (e.g., educators, students, or administrators) can affect the features available for the users, including how many sessions are available for access, data sharing restrictions, user interfaces presentations, among others.

The media server 201 can include a hash 232 data structure. The hash 232 data structure can be accessed by one or more components of the media server 201. In some cases, the hash 232 data structure can be accessed by one or more components within the system 200, such as storing or retrieving information from the data structure. The hash 232 data structure can include, store, or maintain one or more hashes generated by the hash generator 212. The hash can include at least encoded metadata of a session. The hash can be signed using a session key (e.g., signed by one of the servers 206 or the media server 201). The hash can provide a link between the metadata of the session to the device registering for the session. For example, responsive to confirming that the device has permission to access the session, a hash can be computed (e.g., by an API server) with the metadata and signed with a session key. The hash computed with the metadata and signed with the session key can be referred to as a token (e.g., a first token). The token along with metadata of the session can be transmitted to a selective forwarding unit ("SFU") (e.g., a part of the media server 201). The process can be repeated by generating a second hash using the received metadata and signed with a second session key stored in the session key 230 data structure to generate a second token, for example. The first token and the second token can be compared to authenticate the user of the device before accessing the session. Performing the above can enable an authentication logic that is only in one place, such as the API server, and can enable users to access sessions across other servers 206 without leaking any information.

The media server 201 can include a media content 234 data storage. The media content 234 data storage can be accessed by one or more components of the media server 201. In some cases, the media content 234 data storage can be accessed by one or more components within the system 200, such as storing or retrieving information from the data structure. The media content 234 data storage can include, store, or maintain media content streamed, broadcasted, or shared by devices in all breakout sessions, such as audio feeds, video feeds, screen share feeds, whiteboard feeds, text or drawings provided to the whiteboard by one or more users, among other data received from the user. The media content can be referred to as media stream. Each media content can be labeled with at least timestamps, session identifier (e.g., which breakout session the content is being distributed to), account identifier (e.g., account providing the content), device identifier (e.g., device used to access the account permitted to provide the content), file type (e.g., audio or video), among others. The media content can be distributed among users within a session, such as to provide audio or video feeds to participants. The media content can be provided to an administrator device existing outside of the session.

Some media content can be restricted based on the type of user or whether the session is selected on a device. For example, student devices can consume all media content within a session. The student devices may be restricted from accessing or retrieving media content from other sessions. The student devices can provide whiteboard feeds or additional information to the whiteboard of a session. The student devices can be restricted from streaming or broadcasting audio, video, or screen share feeds. In some cases, the host (e.g., an educator using a teacher device or a host device) can remove restrictions from one or more student devices to provide audio, video, or screen share capabilities in a session. The teacher device can access, retrieve, or provide media content across multiple sessions. Within these sessions, the teacher device may not be restricted to any audio, video, screen share, or whiteboard configuration capabilities. The administrator device can access or retrieve media streams across all sessions. The administrator device can be restricted from sharing any audio, video, or screen share feeds or editing on the whiteboard of a session. Further, the administrator device can be restricted from receiving audio feeds from sessions not selected by the administrator. In other words, to access the audio feeds, the administrator using the administrator device can click on a session of interest, such as a link, an image, an icon, or a frame corresponding to a session. The video feeds, screen share feeds, or whiteboard feeds can be presented to devices in any format based on the configuration of the session or settings of the user, such as in fullscreen, windowed, small/medium/large frame, or in tile view for administrator device 204 or teacher device to scroll through different on-going sessions.

The media server 201 can include group information 236 storage. The group information 236 storage can be referred to as permission storage/data structure. The group information 236 storage can be accessed by one or more components of the media server 201. In some cases, the group information 236 storage can be accessed by one or more components within the system 200, such as storing or retrieving information from the data structure. The group information 236 storage can include, store, or maintain at least one account identifier, permission information associated with the account identifier (e.g., to access one or more sessions), or types of permission associated with the account identifier based on the user of the account (e.g., administrator, teacher, or student). For example, a device (e.g., teacher device) can access an application to create a session. The device can configure the settings within the session, such as permission to one or more accounts (e.g., user account identified by an email, username, or nickname). The account can be associated with a device, such that each device having a device identifier can be logged in to an account. Therefore, in some cases, a device identifier can be used as an account identifier. In some cases, multiple devices can log into a single account. In this case, if device identifiers are used to permit users to access a session, the setting of the session can include multiple device identifiers of the same user permitted to access the session. The account identifier or the device identifier can be used to indicate the user of the account or device.

In further example, the group information 236 data structure can include, store, or maintain a listing of sessions and accounts permitted to access the session. Within the listing, the same account can be included in the listing of multiple sessions, such that the device logged in to the account can access multiple on-going sessions (e.g., teacher of the on-going sessions). The group information 236 data structure can include a grouping of account identifiers associated with a student user, teacher user, or administrator user. For each account identifier, the group information 236 data structure can include a subset indicating one or more sessions the account has access to. For example, the student user group can include permission to access one session. The teacher user group can include permission to access at least one session. The administrator user group can include a subset group of all sessions (e.g., the administrator can access all sessions for observation).

The media server 201 can include an information resource 238 data structure. The information resource 238 can be accessed by one or more components of the media server 201. In some cases, the information resource 238 can be accessed by one or more components within the system 200, such as storing or retrieving information from the data structure. The information resource 238 can include, store, or maintain resources of an application used to generate or access one or more sessions (e.g., browser application, video conferencing application, among other applications to provide video lectures to participants). The information resources 238 can include, web pages, native application pages, presentation slides, or any other type of information presentation medium for video conferencing described herein. The information resource 238 can be accessed by one or more client devices 203 or administrator devices 204. In some cases, the resources stored in the information resource 238 can be updated or configured by one or more devices, such as the administrator device 204 configuring the layout or appearance of an application or webpage. The resources stored in the information resource 238 can be used to carry out functionalities detailed herein, including creating sessions, accessing sessions, terminating sessions, among others.

The media server 201 can include at least one interface 208. The interface 208 can be in electrical communication with one or more components of the media server 201. The interface 208 can include hardware, software, or a combination of hardware and software components to interface with the network 202, devices within the system 200 (e.g., client device 203 or administrator device 204), or components of the media server 201. The interface 208 can include features and functionalities similar to the network interface 118 to interface with the aforementioned components. For example, the interface 208 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 208 can include at least a built-in network adapter, network interface card, PCMCIA network card, EXPRESSCARD network card, card bus network adapter, wireless network adapter, USB network adapter, modem or any other device suitable for interfacing one or more devices within the system 200 to any type of network capable of communication. The interface 208 can transmit or receive information from one or more aforementioned components to manage video conferencing by providing breakout sessions or breakout rooms to participants including students and teachers alike.

The interface 208 can receive one or more requests, media streams (e.g., feeds), instructions, commands (e.g., to reject or accept media streams from one or more devices), or electrical signals from devices within the system 200 (e.g., client devices 203 or administrator device 204). The interface 208 can transmit data packets, information, or electrical signals to the devices. The interface 208 can receive data from one or more components of the media server 201, such as the hash generator 212, session manager 216, the application manager 220, or the data repository 224. The interface 208 can transmit or forward received data to one or more components within the media server 201. For example, the interface 208 can receive video, audio, screen share, or whiteboard feeds from one or more devices. The whiteboard feeds can include texts, drawings, or other inputs on the whiteboard page of a session. The whiteboard can include presentation slides, where each slide includes different questions or text for participants of the session to answer or follow during a lecture. The educator can configure texts and images that appear on the whiteboard, where the interface 208 can transmit updates to the whiteboard to one or more devices with participants in the session. The interface 208 can transmit individual whiteboards to student devices, such that each student device can be presented with a copy of a whiteboard. Each participant using a student device can edit or draw on their respective whiteboard, which can be shared with the educator. The whiteboard from each student may or may not be shareable with other students. In some cases, each session can include a centralized whiteboard for the whole class to follow/observe.

The interface 208 can receive metadata of a video conferencing session and a token associated with the session the user is registering for. The metadata of the session can include a list of users with access or permission to the session. The metadata can include other information related to the session, such as a maximum number of participants per session (e.g., max number of participants in the session), the appearance of the session interface (e.g., texts and images), bandwidth threshold allocated for the session, among other information or data in the background of the session. The interface 208 can provide the token to one or more components of the media server 201 for processing. The interface 208 can forward media streams between one or more devices within the system, such as between devices within a session or from student devices to a teacher device, for example.

The media server 201 can include a hash generator 212. The hash generator 212 can be referred to as a hash calculator or a hash computing component. The hash generator 212 can calculate a hash of the metadata of a session. The hash generator 212 can sign the hash with a cryptographic key shared with the access control server (e.g., API server). The cryptographic key can be stored in the session key 230 or the database of the access control server. For example, the hash generator 212 can receive a first hash computed using session metadata and signed with a first key from the client device 203. The signed first hash can be referred to as a token (e.g., a first token). The hash generator 212 can receive the session metadata as a separate data packet from the client device 203 or extract the session metadata from the first hash. Using the session metadata, and similar to the access control server, the hash generator 212 can generate a second hash computed from the session metadata. The hash generator 212 can sign the second hash with a second key (e.g., a cryptographic key or session key) stored locally in the session key 230 data structure. The cryptographic key may not be accessed by any of the client devices 203 nor the administrator device 204. The signed second hash can be referred to as a second token. The hash generator 212 can store the computed or received hash in the hash 232 data structure. The first token and the second token can be sent to the session manager 216.

The media server 201 can include at least one session manager 216. The session manager 216 can manage incoming or outgoing information within a session, such as media streams to or from one or more devices. In some cases, the media server 201 can include multiple session managers 216, each session manager 216 managing an existing session. The session manager 216 can create a session responsive to a request for a session from a host device. The session manager 216 can provide audio/video/screen share streams separately from the whiteboard streams, as described herein, such as in FIGS. 4-6. The session manager 216 can generate a session key (e.g., cryptographic key or secret key) associated with the session responsive to creating the session. The session key can be shared with an access control server without being shared to client devices 203, administrator device 204, or other servers 206.

For example, the session manager 216 can receive a first token and a second token. The first token can include a first hash computed by an access control server using session metadata, the first hash signed with a cryptographic key stored in the access control server. The second token can include a second hash computed by the hash generator 212 using the session metadata forwarded by the client device 203 and signed using a cryptographic key stored in the session key 230 data structure (e.g., shared key between the media server 201 and the access control server). The session manager 216 can compare the first token to the second token (e.g., comparing the metadata and the cryptographic keys from each server). Comparing the first token to the second token can refer to comparing the first hash with the first session key to the second hash with the second session key, for example. If they are matched, the session manager 216 can accept the session registration request (e.g., to send or receive streams for a particular session) from the client device 203. If not matched, the session manager 216 can reject the session registration request. One or more users can register for the session to receive or transmit feeds within the session. Therefore, the media server 201 can provide an additional permissioning logic before transmitting streams to participants. Once registered, the client device 203 can be ready to receive or transmit media streams.

The session manager 216 can sanitize or pre-process media streams incoming to or outgoing from the session. For example, the session manager 216 can apply animation, machine learning transform, background blur, among other filters to video feeds prior to streaming the video to the session. The session manager 216 can apply filters or tune audio streams prior to streaming the audio. In some cases, the video/audio/screen share streams can be sanitized before the media server 201 receives the streams, such as on one of the servers 206.

The session manager 216 can terminate a session if no participant (e.g., teachers, students, or administrator) is present in the session or if all participants leave the session. The session manager 216 can keep the session available based on a scheduled time slot. For example, the host can register for a session from a first time to a second time (e.g., 1 hour block from 1 PM to 2 PM). The session manager 216 can generate the session at least at the first time, a predetermined time prior to the first time (e.g., 5 minutes or 10 minutes before starting the session), or when a user registers or accesses the session. The session manager 216 can manage access permissions of the session. For example, the session manager 216 can receive, from a host of the session, a listing or indications of accounts permitted or invited to access the session. When receiving a registration request, the session manager 216 can refer to the listing of accounts with permission to determine whether to accept or reject the registration request. The listing can be provided to the access control server to determine if one or more users have access to the session.

The session manager 216 can manage the settings or configurations of each participant in the session. For example, the session manager 216 can receive one or more commands from a host device to adjust the settings of the sessions or permission of participants. The settings can include enabling or disabling read/write capabilities for the participants, such as enabling or disabling media streams to or from the participants. At default settings, the session manager 216 can enable audio/video/whiteboard/share-screen read capabilities (e.g., enable consumption of media streams) for all participants. However, at default settings, the participants can be limited to write on the whiteboard of the session. The session manager 216 can provide whiteboards independently to each participant. In some cases, the session manager 216 can provide a centralized whiteboard to all participants (e.g., similar to screen sharing to participants). The permission information can be stored in the group information 236 storage.

The session manager 216 can receive one or more commands from the host device configuring read/write features for at least one participant. For example, the session manager 216 can receive a command to enable audio feeds from a first device (e.g., first client device or first student device). Once enabled, the session manager 216 can stream the audio to the host device (e.g., a second client device). In some cases, the audio feeds from the first client device can be transmitted to other devices, such as a third client device (e.g., a second student device) or an administrator device 204, which can exist outside the session. In other cases, based on the session settings, the session manager 216 can transmit the audio feeds from the first client device to the second client device without transmitting to the third client device (e.g., only transmit feeds to the host device without transmitting to other participants).

The session manager 216 can receive a registration request from a device for an on-going session. Responsive to comparing the token received from the device and the hash computed by the hash generator 212 and signed using a cryptographic key, the session manager 216 can determine if there is a match or an unmatched hash. If matched, the session manager 216 can provide at least one media stream (e.g., audio/video/whiteboard/screen share feeds) of the video conferencing session to the device (e.g., a first client device or a student device).

The session manager 216 can identify one or more client devices 203 within a subgroup of devices based on the session metadata. Each subgroup can include different permission to send or receive media streams or which types of media streams. For example, the session manager 216 can identify, from the session metadata, a first client device in a subgroup (e.g., a first subgroup) of devices. The session manager 216 can identify that the first subgroup allows sending of media streams to devices outside the subgroup, but may not send media streams to other devices within the subgroup. The subgroup can include devices with permission to receive a media stream (e.g., audio/video/whiteboard stream) from a second device, such as a host device. Responsive to identifying that the first client device is among the subgroup, the session manager 216 can forward the media stream to the first client device, the media stream received from the second device. Further, if the session manager 216 identifies a third client device or other client devices as being in the subgroup, the session manager 216 can forward the media stream, from the second client device to the third device (e.g., or other devices within the first subgroup) responsive to the identification of the first subgroup as including the third client device. In some cases, the media stream may not include at least one video, audio, screen share, or whiteboard feed. For example, when transmitting the media stream to the first client device and/or the third client device, the session manager 216 can transmit audio streams without video streams, video stream and audio stream without screen share stream, whiteboard stream without video stream, among other combinations.

In some cases, the session manager 216 can receive media streams from each of the student devices (e.g., the first client device or the third client device). The session manager 216 may not transmit media streams from a student device to other student devices. For example, the session manager 216 can receive a media stream from each of the first client devices and the third client device. The session manager 216 may not forward the media stream from each of the first client device and the third client device to the other of the first client device and the third client device. However, the session manager 216 can forward the media stream from each of the first client devices and the third client device to the second client device (e.g., a host device). Therefore, the host device can receive media streams from all users within the session, while maintaining privacy across other participant devices.

The session manager 216 can identify a second subgroup as having permission to receive media streams from devices within the first subgroup. For example, the session manager 216 can identify a second device (e.g., a host device) within a second subgroup of devices. The session manager 216 can forward a media stream from each of the first client device and the third client device (e.g., referring to the previous example) to the second client device, responsive to an identification of the second client device as included in a second subgroup. The session manager 216 can transmit a media stream from at least one device within the second subgroup to one or more devices within the first subgroup. For example, the session manager 216 can transmit a media stream from the second client device to the first client device and the third client device.

The session manager 216 can receive a command (e.g., setting configuration in the session) from the host of a session to accept or reject media streams from one or more devices. For example, the session manager 216 can receive a command, from a host device, to reject a media stream from a first client device. Responsive to receipt of the command, the session manager 216 can transmit a command to the first client device to stop transmitting the media stream. Transmitting the command to the first client device can refer to the session manager 216 configuring the session setting on the client-side to stop transmitting the media stream. Stopping the media stream can include muting, terminating screen share, or disabling video feeds from the device.

The session manager 216 can forward a subset of media streams to other users without sending the media stream back to the source of the media stream. For example, the session manager 216 can forward a subset of media streams including a media stream received from a second client device (e.g., a host device) to a first client device (e.g., student device) and not including a media stream received from the first client device. Therefore, the first client device can receive media streams from other devices without receiving the media stream that was sent to the other devices. Similar logic can apply to other devices sending or receiving one or more media streams. In further example, the subset of media streams may not include a second media stream received from a third client device (e.g., a second student device). The session manager 216 can forward or provide a second subset of media streams to the third client device, where the second subset can include a media stream received from both the first client device and a media stream received from the second client device. The session manager 216 can manage other combinations of media streams distribution between host devices and student devices. The session manager 216 can provide all received media streams to the administrator device 204, such as audio stream, video stream, whiteboard stream, or screen share stream. The session manager 216 can provide the audio stream to the administrator device 204 responsive to the administrator device 204 selection of the session. In some cases, the session manager 216 may not provide an audio stream to the administrator device 204, for example, if the administrator device 204 did not select the session or if the administrator device 204 selects one of the various other sessions.

The media server 201 can include an application manager 220. The application manager 220 can manage the user interface or appearance of the application one or more devices use to access at least one session. The application can execute in-browser or on the operating system of a device. For example, the application manager 220 can provide a first user interface or layout of the application/session to a first group of devices, a second layout to a second group of devices, a third layout to a third group of devices, etc. Each group of devices can include student devices (e.g., first group), educator/host devices (e.g., second group), or administrator devices 204 (e.g., third group). For the first group, the application manager 220 can provide a full-screen view, expanded view, or theater view of the streams from the host device to one or more devices in the first group, the one or more devices registered in the session hosted by the host device. If the session is configured such that all participants can send and receive video streams (e.g., share screen or whiteboard with other devices), the application manager 220 can display users of devices in the session in tile views. The application manager 220 can display video/screen share/whiteboard streams with other appearances or styles.

Still referring to the above example, for the second group, the application manager 220 can provide one or more frames in tile views showing all on-going sessions the host is managing or presenting to. The host device can select at least one of the sessions represented via one or more frames to provide a media stream (e.g., audio stream) to devices within the selected session. In some cases, the application manager 220 can provide different tabs for each session managed by the host device. The application manager 220 can provide similar visual interfaces or appearances to the administrator device 204 (e.g., devices in the third group). For example, the application manager 220 can provide the administrator device 204 with a paginated set of sessions (e.g., whiteboard sessions). The application manager 220 can enable scrolling for the administrator device 204 to scroll and observe all on-going sessions within the application (e.g., limited to the institution of the administrator). The application manager 220 can provide other user interfaces to each device to improve the visualization and efficiency for hosts or moderators to manage the sessions. In some cases, the application manager 220 can configure the appearance of the user interface responsive to receipt of a command from the administrator device 204.

The application manager 220 can manage, notify, or provide one or more notifications to devices using the application. For example, the application manager 220 can notify one or more devices of at least the status of the application (e.g., maintenance time or downtime), at least one attempt by an account to join a session, network bandwidth of at least one session (e.g., the session a user is participating in or observing outside the session), users muted in a session, among other notifications in an application. The application manager 220 can receive commands from the host device to manage users in one or more sessions, such as enabling or disabling streams for one or more users. For example, the application manager 220 can receive a mute request from the host device of a first session and a second session. In response to the mute request, the application manager 220 can mute all devices participating in the first session and the second session except for the host.

The application manager 220 can manage media streams from multiple sessions executing on the application. For example, the application manager 220 can receive media streams from sessions hosted by a host device. The application manager 220 can transmit the media streams (e.g., video streams, whiteboard streams, or screen share streams)

to at least the host device or the administrator device 204. The application manager 220 may not transmit audio streams from all the sessions to the devices. Instead, depending on a session selected by the device (e.g., host device or administrator device 204), the application manager 220 can transmit the audio streams associated with the selected session to the device. For example, the application manager 220 can manage a first session and a second session for a host device. The application manager 220 can send video/screen share/whiteboard streams from participants of the first session and the second sessions to the host device (e.g., for display on the display device of the host device). Responsive to the host device selecting the first session, the application manager 220 can transmit the audio streams of the first session to the host device without audio streams from the second session. Selecting a session can refer to clicking in a frame on an interface representing the session, hovering over the session, or other interactions with the frame of the session.

Figure 3:
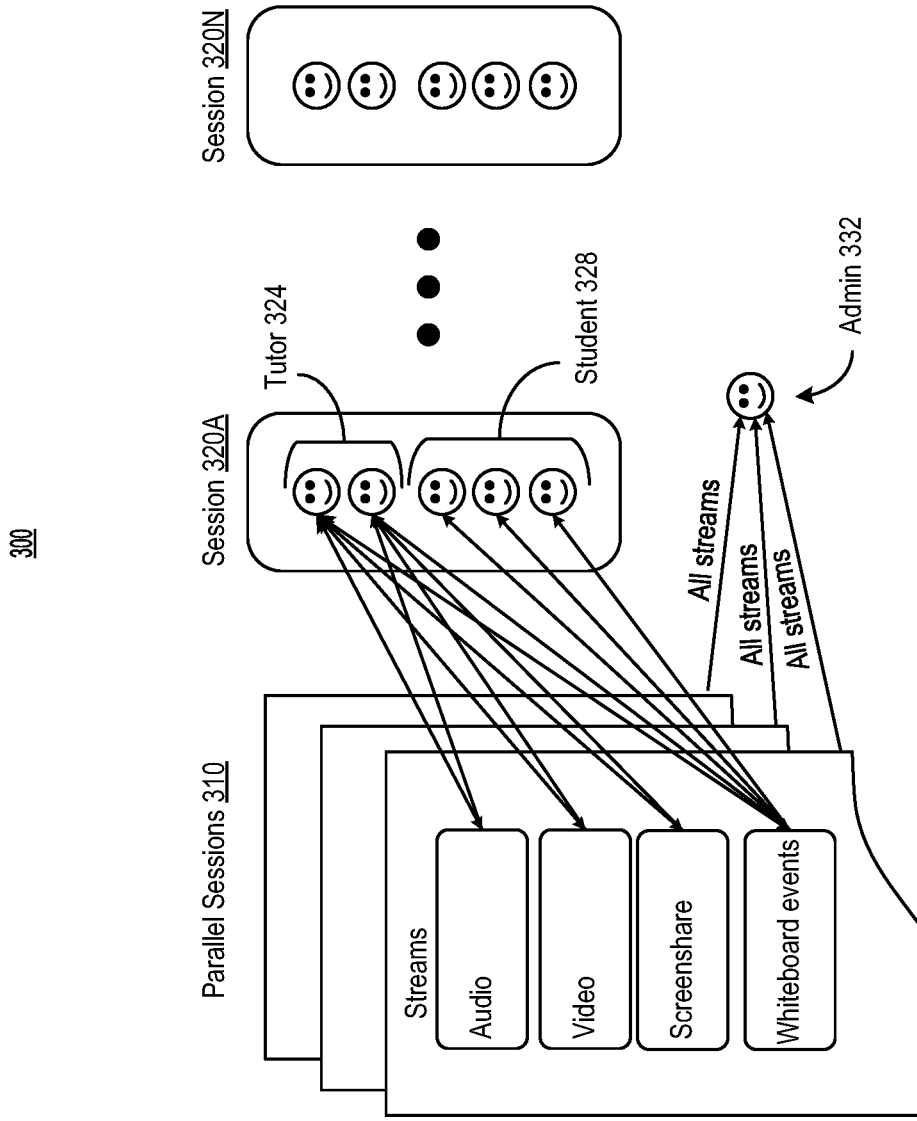
FIG. 3 is an example illustration of an administrator, tutors, and students engaging with one or more parallel sessions, in accordance with one or more implementations.

FIG. 3 shows an example illustration of an administrator, tutors, and students engaging with one or more parallel sessions, in accordance with one or more implementations. The example operations presented in illustration 300 can be executed, performed, or otherwise carried out by one or more components of the system 200 (e.g., media server 201, network 202, client device 203, administrator device 204, or server 206), the computer system 100 described herein in conjunction with FIGS. 1A-1D, or any other computing devices described herein. The illustration 300 can include one or more parallel sessions 310, sessions 320A-N (e.g., generally referred to as session(s) 320), one or more tutors 324 (e.g., generally referred to as tutor(s) 324), one or more students 328 (e.g., generally referred to as student(s) 328), and at least one administrator 332.

The parallel sessions 310 can be created or executed on an application managed by a server. Each of the parallel sessions 310 can include one or more participants, such as presented in at least session 320. For example, one or more tutors 324 and one or more students 328 can participate in one of the parallel sessions 310. At least one tutor 324 can manage, monitor, or participate in multiple parallel sessions 310. The feeds (e.g., video, audio, screen share, or whiteboard events) from each parallel session 310 can be separated. The media server (e.g., media server 210 or at least one server managing the application) can dynamically multiplex the one or more feeds to one or more participants of the session 320.

The student 328, the tutor 324, or the administrator 332 can have different permission for sending or receiving media streams from a parallel session 310. For example, a student 328 can join a single session at a time. In other words, by joining a first parallel session, the student 328 may not join a second parallel session. The student 328 can consume all of the incoming streams (e.g., audio, video, screen share, or whiteboard). The student 328 can have full read/write capabilities for whiteboard and full read for all audio/video and screenshare streams. Read or write capabilities can refer to permission for receiving or sending media streams, respectively. If allowed by the host (e.g., at least one tutor 324) of the session 320, the student 328 can have write capabilities (e.g., can send a media stream) when permitted by the host. For example, when registered for a session 320, the student 328 can be muted, such that the host or other students 328 do not receive audio streams from the student 328. The host can enable or disable media streams to or from one or more students 328 of the session 320. If the host unmuted the student 328, the student 328 can send audio streams to the host through the media server. Depending on the settings of the session, the media server can forward the audio streams from the student 328 to other students 328 within the session 320.

The tutor 324 can multitask across multiple parallel sessions 310. For example, a first tutor can manage or observe session 320A and session 320B and a second tutor can manage or observe session 320C and session 320D. Based on the registered sessions 320, the first tutor can send/receive media streams to/from session 320A or session 320B and not to/from session 320C or session 320D. Similarly, the second tutor can send/receive media streams to/from session 320C or session 320D and not to/from session 320A or session 320B. In some cases, the tutors 324 can request, accept, or decline joint sessions, such that at least one tutor 324 can join or participate in another session hosted by at least one other tutor 324. When managing multiple parallel sessions 310, the tutor 324 can have full read/write to the audio, video, and screen share feeds for a selected session. The tutor 324 can continue to receive incoming whiteboard feeds from all ongoing parallel sessions 310. When no session has been selected, the tutor 324 can continue to receive video and screen share streams from one or more participants from the parallel sessions 310.

The administrator 332 can have access to all ongoing parallel sessions 310 in the institution (e.g., in the application executing the sessions 310). Similar to the tutor 324, the administrator 332 can have capabilities to receive audio, video, or screen share feeds from a selected session. The administrator 332 can receive video or screen share feeds without selecting any session. The administrator 332 may not broadcast into any of these sessions. In some cases, if the administrator 332 joined a session as a participant, the administrator 332 can have the ability to send audio, video, or screen share feeds, for example, if enabled by the tutor 324 of the session. In some cases, the administrator 332 can have administrator privileges over the tutor 324, thereby overwriting settings or permission settings provided by the tutor 324 of a session. Similarly, the administrator 332 can receive whiteboard streams from participants of a session. In some cases, the administrator 332 can receive the whiteboard streams only from a selected subset of one or more sessions. For example, the administrator 332 can receive a set of session visible to the administrator, such as sessions 320A-N. The administrator 332 can select sessions 320A-C from the list of sessions 320A-N. Accordingly, the media server can send at least one media stream (e.g., video, screen share, or whiteboard events) from the selected sessions 320A-C to the administrator 332. The administrator 332 can scroll through a paginated set of whiteboard sessions (e.g., 20 shown at a time or other numbers depending on the application settings). Thus, the server (the media server or the administrator 332) may not be overloaded with streams received from all sessions (e.g., 100 or more sessions), which have to be processed or accessed. Thus, the systems and methods described in operation 400 provides improvement over the traditional WEBRTC by having a separate solution for audio, video, and screen share streams compared to whiteboard events.

Figure 4:
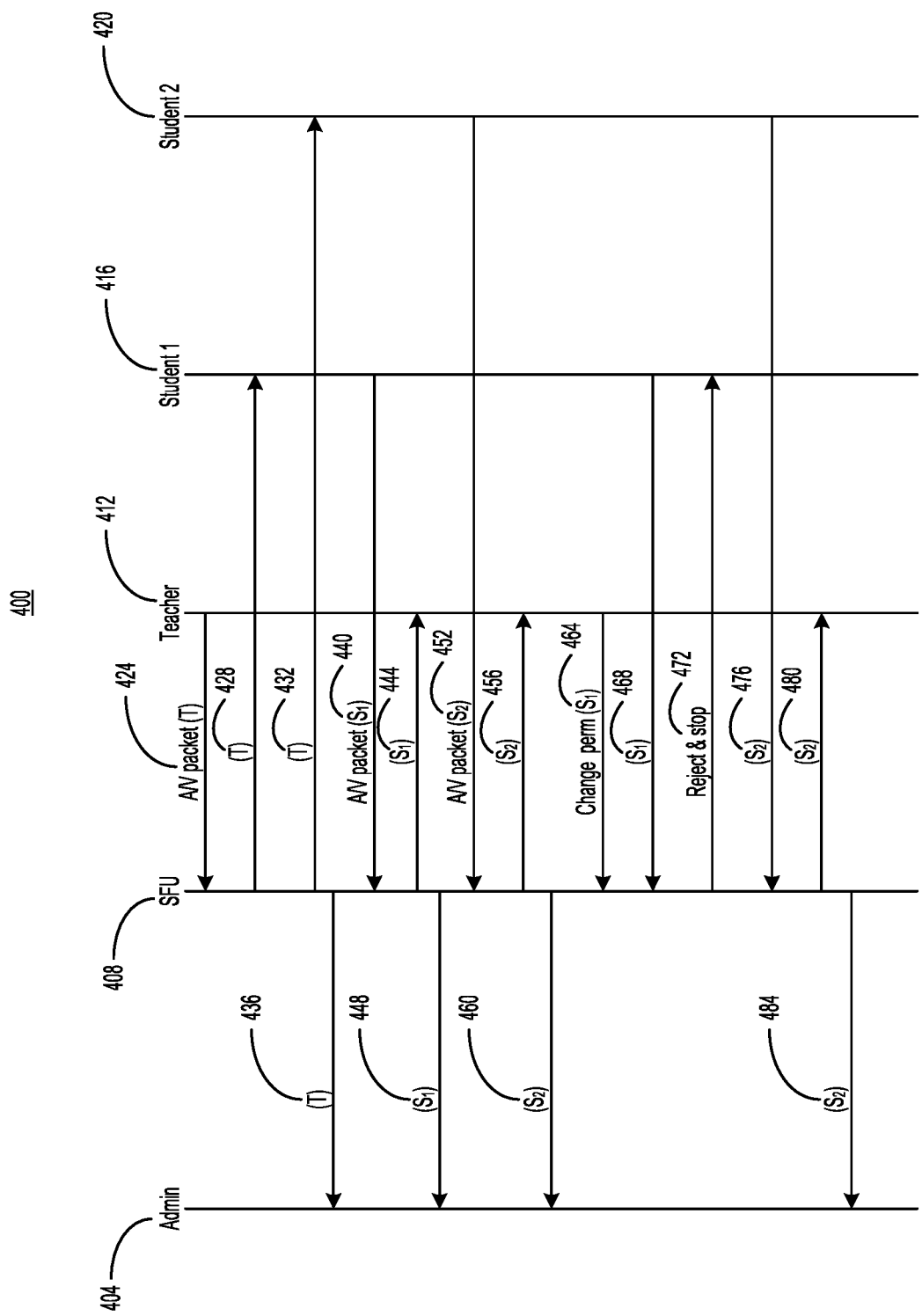
FIG. 4 is an example flowchart for transmitting streams to one or more participants, in accordance with one or more implementations.

FIG. 4 illustrates an example flowchart for transmitting streams to one or more participants, in accordance with one or more implementations. The operation 400 can be executed, performed, or otherwise carried out by one or more components of the system 200 (e.g., media server 201, network 202, client device 203, administrator device 204, or server 206), the computer system 100 described herein in conjunction with FIGS. 1A-1D, or any other computing devices described herein. The operation 400 can be executed to pass one or more media streams (e.g., audio, video, or screen share) to one or more devices. The operation 400 can perform features and functionalities of transmitting media streams (e.g., audio, video, screen share, or whiteboard events) to one or more participants in a session or at least one user observing outside the session (e.g., administrator 404). The operation 400 can include at least one administrator 404, an SFU 408 (e.g., a media server 201 or component of the media server 201), a teacher 412 (e.g., a user of a host device), and one or more students (e.g., first student 416 or second student 420) to send or receive one or more data packets.

The operation 400 can leverage the API of WEBRTC, which can receive or obtain media streams from one or more users within a session, such as receiving audio or video streams from a teacher 412. The API can sanitize, filter, or enhance the streams, such as animate, machine learning transform, or background blur the media streams. The API can send one or more sanitized streams to an SFU 408 based backend server, such as transmitting audio or video stream packets at step 424 from the teacher 412 to the SFU 408. The SFU 408 based backend server can be referred to as a media server or can be a component of the media server (e.g., perform or execute one or more features of the media server). Before delivering a stream (e.g., video, whiteboard events, or screen share), the SFU 408 can adjust or correct the resolution of the stream based on the resolution on the display device of each user using scalable video coding ("SVC") technique. The SFU 408 can depend on additional permissioning logic before transmitting streams to the participants of a session.

The SFU 408 can receive media stream packets (e.g., sanitized by the API) from other users, including at least student 416, student 420, or the administrator 404 (e.g., if participating in a session). The SFU 408 can correct the resolution for all media stream packets prior to sending them to one or more participants of a session. For example, at step 424, the SFU 408 can receive an audio or video ("A/V") packet (e.g., generally referred to as (T) or a first packet). The SFU 408 can transmit (T) to student 416 at step 428, student 420 at step 432, and administrator 404 at step 436.

The host of the session (e.g., teacher 412) can send a command to the SFU 408 not to share at least one media stream from at least one student to other students, such as not to share streams from student 416 to student 420, vice versa. For example, SFU 408 can receive A/V packet ($S_1$) from student 416 at step 440. The SFU 408 can transmit ($S_1$) to teacher 412 at step 444 and the administrator 404 at step 448 without transmitting ($S_1$) to student 420. In another example, the SFU 408 can receive A/V packet ($S_2$) from student 420 at step 452. The SFU 408 can transmit ($S_2$) to teacher 412 at step 456 and the administrator 404 at step 460 without transmitting ($S_1$) to student 420.

The SFU 408 can receive a command from the host to change the permission of a participant, such as to stop streaming feeds or begin streaming feeds, such as to prevent race conditions from multiple participants sending media streams. For example, SFU 408 can receive a change of permission from the teacher 412 at step 464. The change of permission can include rejecting or stopping streams from student 416. Accordingly, for example, when the SFU 408 receives ($S_1$) from student 416 (e.g., at step 468), the SFU 408 can transmit a command to the application executing on student 416 device to reject or stop receipt of the media stream (e.g., at step 472). Accordingly, the SFU 408 may not transmit ($S_1$) received from student 416 to other participants, including administrator 404 subsequent to the change in permission. The SFU 408 can notify the student 416 that the media stream from the student 416 is being rejected or stopped.

The change in permission may not affect student 420. For example, at step 476, the SFU 408 can receive ($S_2$) from student 420. Subsequently, the SFU 408 can proceed to send ($S_2$) to the teacher 412 at step 480 and the administrator 404 at step 484. Before receiving or sending media streams to or from participants or users observing a session, each device or account of the participant should be registered with the SFU 408 for sending or receiving streams for a particular session. The operation or steps to register with the SFU 408 can be performed via the operations described in FIG. 5, for example.

Figure 5:
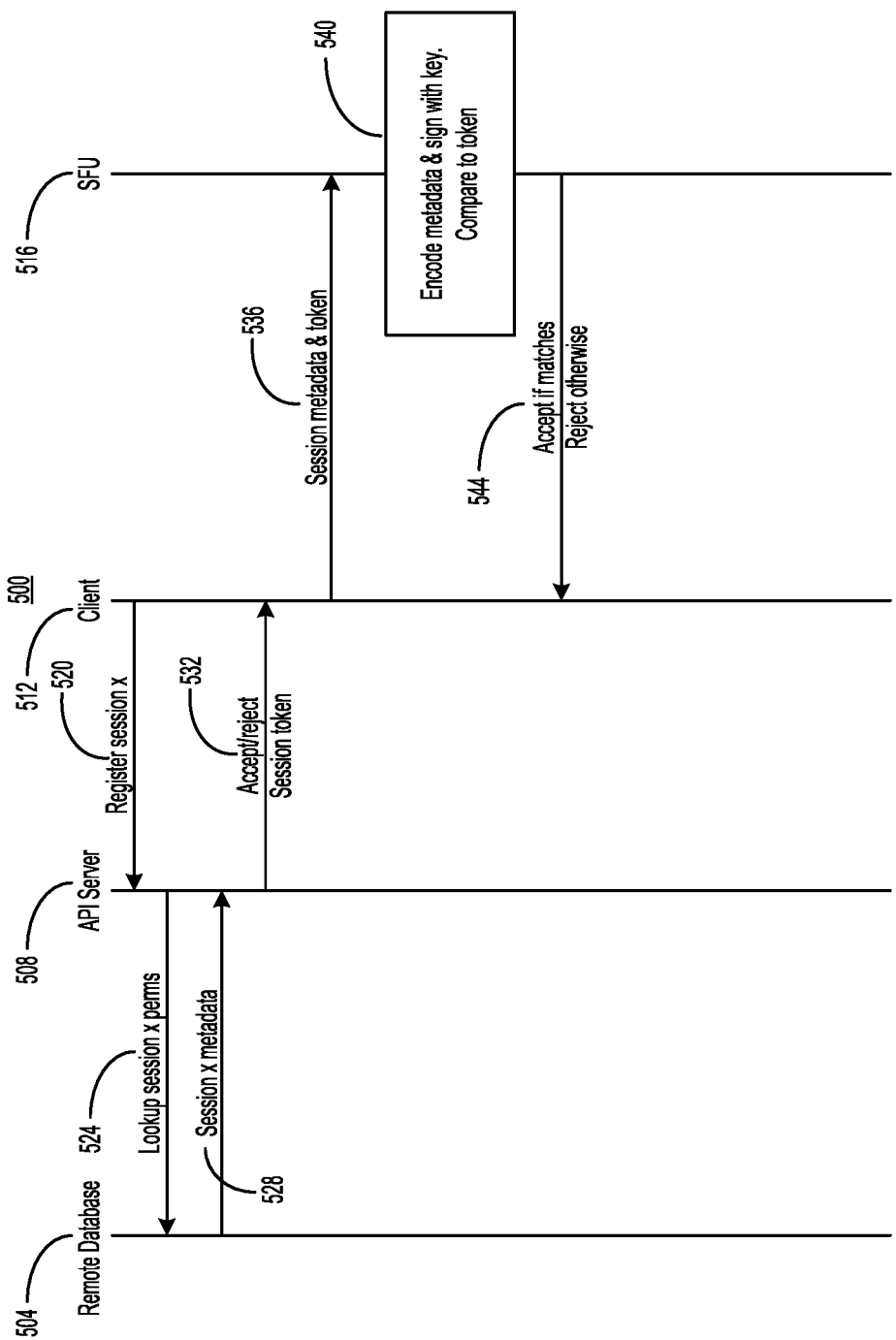
FIG. 5 is an example flowchart for registering for a session, in accordance with one or more implementations.

FIG. 5 illustrates an example flowchart for registering for a session, in accordance with one or more implementations. The operation 500 can be executed, performed, or otherwise carried out by one or more components of the system 200 (e.g., media server 201, network 202, client device 203, administrator device 204, or server 206), the computer system 100 described herein in conjunction with FIGS. 1A-1D, or any other computing devices described herein. The operation 500 can perform features and functionalities of registering a client (e.g., participant, student, or tutor) to a session. The operation 500 can include at least one database 504, at least one API server 508 (e.g., access control server), at least one client 512 (e.g., client device), and at least one SFU 516 (e.g., a media server 201 or component of the media server 201) to verify the identity of the client 512 and register the client 512 to a session.

The API server 508 and SFU 516 can share a secret key (e.g., cryptographic key or session key). When a client 512 requests registration for a session (e.g., step 520), the API server 508 can fetch the metadata for the session from the database 504. Based on the metadata, the API server 508 can perform a lookup of the session permission to determine if the client 512 has access to the session being requested (e.g., step 524). The API server 508 can retrieve the session metadata from the database 504 (e.g., at step 528).

Based on the permission, the API server 508 can compute a hash of the session metadata, if the client 512 has permission. The API server 508 can sign the hash with the secret key shared between the API server 508 and the SFU 516. The signed hash can be referred to as a token. If the client 512 does not have permission, the API server 508 can send an indication rejecting the client 512 of registration request. For example, at step 532, the API server 508 can send the token (e.g., session token) including a signed hash to the client 512 upon confirming that the client 512 has permission. On the other hand, also at step 532, the API server 508 can reject the registration request if the client 512 does not have permission. Further, at step 536, the client 512 can forward the token alongwith the session metadata to the SFU 516. The token and the session metadata can be sent as separate data packets. The SFU 516 can extract the session metadata from the session token.

At step 540, the SFU 516 can encode the session metadata received from the client 512 to compute a hash (e.g., a second hash). The computed hash can be signed using a cryptographic key stored in the data repository of the SFU 516. The hash computed and signed by the SFU 516 can be referred to as a second token. Further, at step 540, the SFU 516 can compare the token received from the client 512 to the second token. At step 544, the SFU 516 can send an acknowledgment of or accept the registration request from the client 512 if the two tokens matched. Otherwise, the SFU 516 can reject the registration request if the two tokens do not match. Thus, the authentication logic can be maintained in one place (e.g., API server), which enables users to access sessions across other servers without leaking any information, such as metadata, session key, media streams, among other data from other servers.

Figure 6:
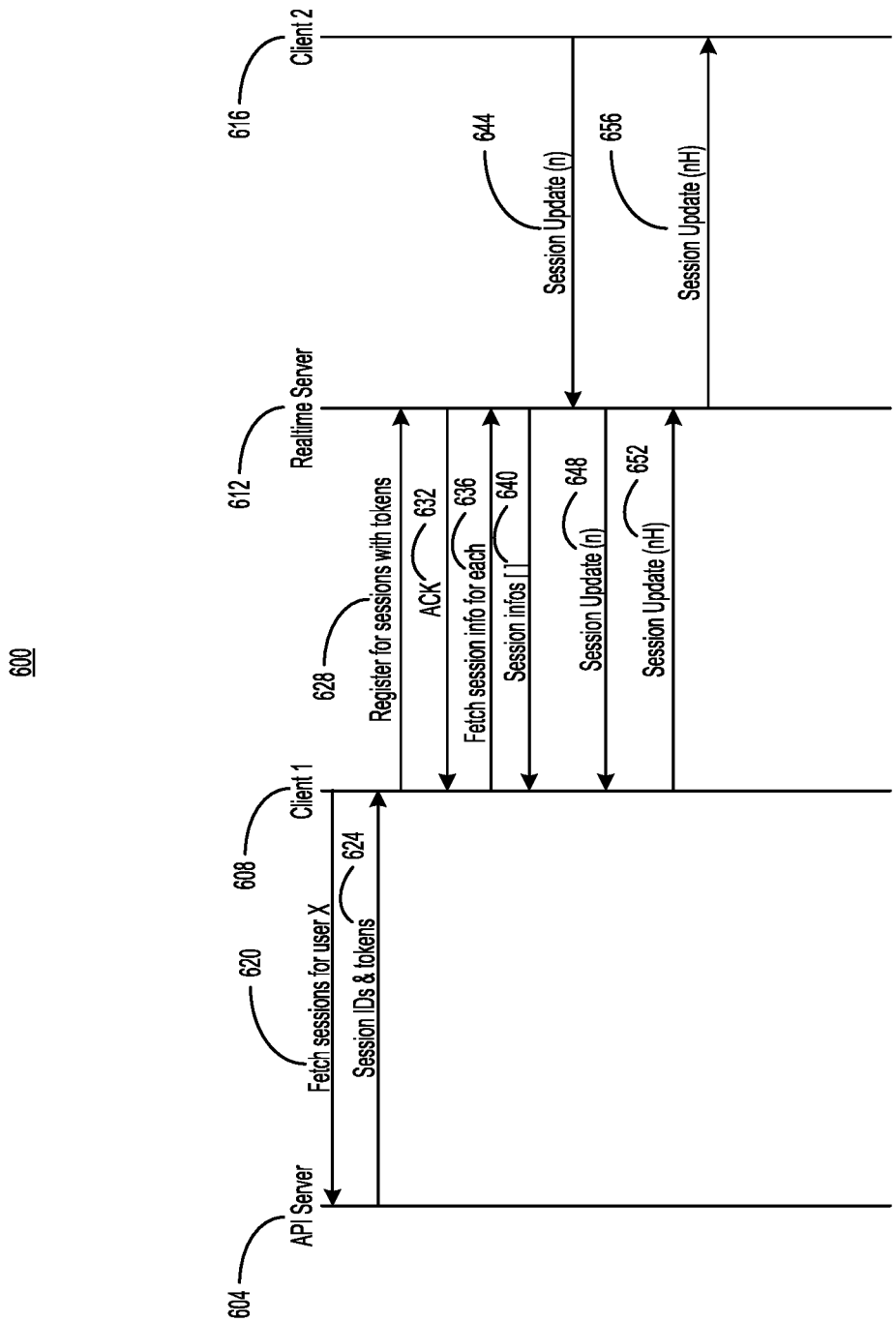
FIG. 6 is an example flowchart for updating a session, in accordance with one or more implementations.

FIG. 6 illustrates an example flowchart for updating a session, in accordance with one or more implementations. The operation 600 can be executed, performed, or otherwise carried out by one or more components of the system 200 (e.g., media server 201, network 202, client device 203, administrator device 204, or server 206), the computer system 100 described herein in conjunction with FIGS. 1A-1D, or any other computing devices described herein. The operation 600 can perform features and functionalities of updating a session whiteboard accessed, observed, or registered by one or more clients, such as educators, students, or an administrator. The operation 600 can include at least one API server 604 (e.g., access control server), one or more clients, participants, or observers (e.g., client 608 or client 616), and at least one real-time server 612. The one or more clients can refer to one or more client devices. The API server 604 or the real-time server 612 can perform one or more features and functionalities of one or more components of at least one server 206 or the media server 201, for example.

One or more clients, such as client 608 can register or access a session to receive updates from the session. For example, at step 620, the client 608 can fetch at least one session for the user (e.g., arbitrary user "x") of the client 608 from the API server 604. Fetching more than one session can be performed by a host device hosting multiple on-going parallel sessions or an administrator device. The API server 604 can send the session identifier and a token of the session to the client 608 (e.g., at step 624). The session identifier and the token can be associated with a session that the client 608 has permission to access. At step 628, the client 608 can send a request to register for a session with the token for the session to the real-time server 612. Upon confirming that the token matched with the token computed and signed by the real-time server 612, the real-time server 612 can transmit an acknowledgment, approving the registration request of the client 608 (e.g., at step 632).

At step 636, the client 608 can fetch session information of a session from the real-time server 612. At step 640, the real-time server 612 can respond with the requested session information. Participants of a session can provide one or more updates to the real-time server 612, of which the real-time server 612 can send the session update to at least one other participant. For example, at step 644, client 616 can edit a whiteboard of the session, thereby sending session update (n) to the real-time server 612. Responsive to receiving session update (n), the real-time server 612 can send the session update (n) to client 608 (e.g., at step 648). Similarly, if client 608 edit the whiteboard, the client 608 can send a session update (nH) to the real-time server 612 (e.g., step 652). In response to receiving the update, the real-time server 612 can send the session update (nH) to client 616 participating in the session (e.g., at step 656). If the client 616 is a student participating in the session and the client 608 is a host of the session, the real-time server 612 can send updates from client 616 to client 608 without sending the updates to other devices (e.g., one-on-one whiteboard settings enabled). If the whiteboard is centralized for the session, the real-time server 612 can send updates from the client 616 to all participants. The real-time server 612 can send updates from the client 608 to all participants as a default setting.

Whiteboard events can be presented using the following construct/code:

```
SessionUpdates {
    updates: SessionUpdate[ ]
    userid: string
    ts: timestamp
}
```

The "string" can refer to any characters including one or more letters or numbers. In this case, the string can be used to represent the user identifier of a client (e.g., client 608 or client 616). The timestamp can be the time at which the session update takes place or when at least one client of the session provides an update to the session.

Each session update can include the following construct/code:

```
{
    type: string
    delta: Delta
    frame: string
    metadata: Metadata
    points: [x, y]
}
```

The "string" in type can include characters or numbers representing the type of updates for the whiteboard, for example. In some cases, the update can be of drawing type or text type. The "Delta" can represent or include the difference in the states of the whiteboard. For example, a user can add a text or a drawing on the whiteboard, which can be presented as the "Delta" in this case. The delta can be in a string, bits, or other forms of code. The frame can include a number or bits representing a count of the current frame being sent to a client in a session. The "Metadata" can include additional information on the whiteboard, such as questions attached to a frame, images on the whiteboard, background of the whiteboard, among other configurations on the whiteboard editable by the host sharing the whiteboard. The points can include the x and y coordinates of the mouse pointer. For example, in each frame, the mouse pointer of the whiteboard presenter (e.g., host or client with permission to edit the whiteboard) can change position. With the "points" update, the position of the mouse pointer can be updated on the display device of one or more other clients. The real-time server 612 can send one or more whiteboard events to update the session of one or more clients (e.g., client 608 or client 616).

One or more client devices can edit a whiteboard and send updates for the edited whiteboards to the real-time server 612. The real-time server 612 can send the updates to one or more other clients. The client (e.g., educator or administrator) can receive updates to the whiteboard differently based on whether a session or a frame associated with the session was selected or not. For example, for currently active sessions or frames (e.g., selected session), the client can receive updates to the mouse movement and real-time freehand points. In another example, for sessions or frames not selected the client can receive one or more updates responsive to when the drawer or whiteboard editor is done with the drawing (e.g., finished with strokes or object manipulation/movement). Thus, the above-mentioned updating scheme can reduce the overall latency for updating any drawing or movement on the visible/active whiteboard, whereas one or more other whiteboards can update after the drawer finished the drawing or manipulating an object.

The clients (e.g., educators or administrators) can register for one or more sessions or frames that are visible in their viewport at any point. The viewport can be the main interface shown to a client when logged into an application. The viewport can include one or more sessions hosted by the client (e.g., for educators) or any on-going sessions in the institution (e.g., for an administrator). For example, as an administrator, a given web-browsing session can include 100 frames (e.g., slides or pages), but the viewport of the administrator may have 5 of the session as thumbnails in their scrollable frames.

In further example, the viewport of an educator can include 7 sessions going on in parallel, whereas the viewport of an administrator of an institution can include 100 sessions, but only 4 thumbnails might be visible in the session selection scrollable panel (e.g., providing 4 sessions for selection at a time). The client, such as the educator or the administrator, can manipulate the thumbnails as desired, including moving the thumbnails. The clients can register or deregister for updates for the one or more sessions or frames that the clients either select or deselect (e.g., enter or exit the panels), respectively. Therefore, the client can automatically register or deregister for a session and receive or not receive updates from one or more sessions upon selection or deselection of a session or a frame representing the session.

Figure 7:
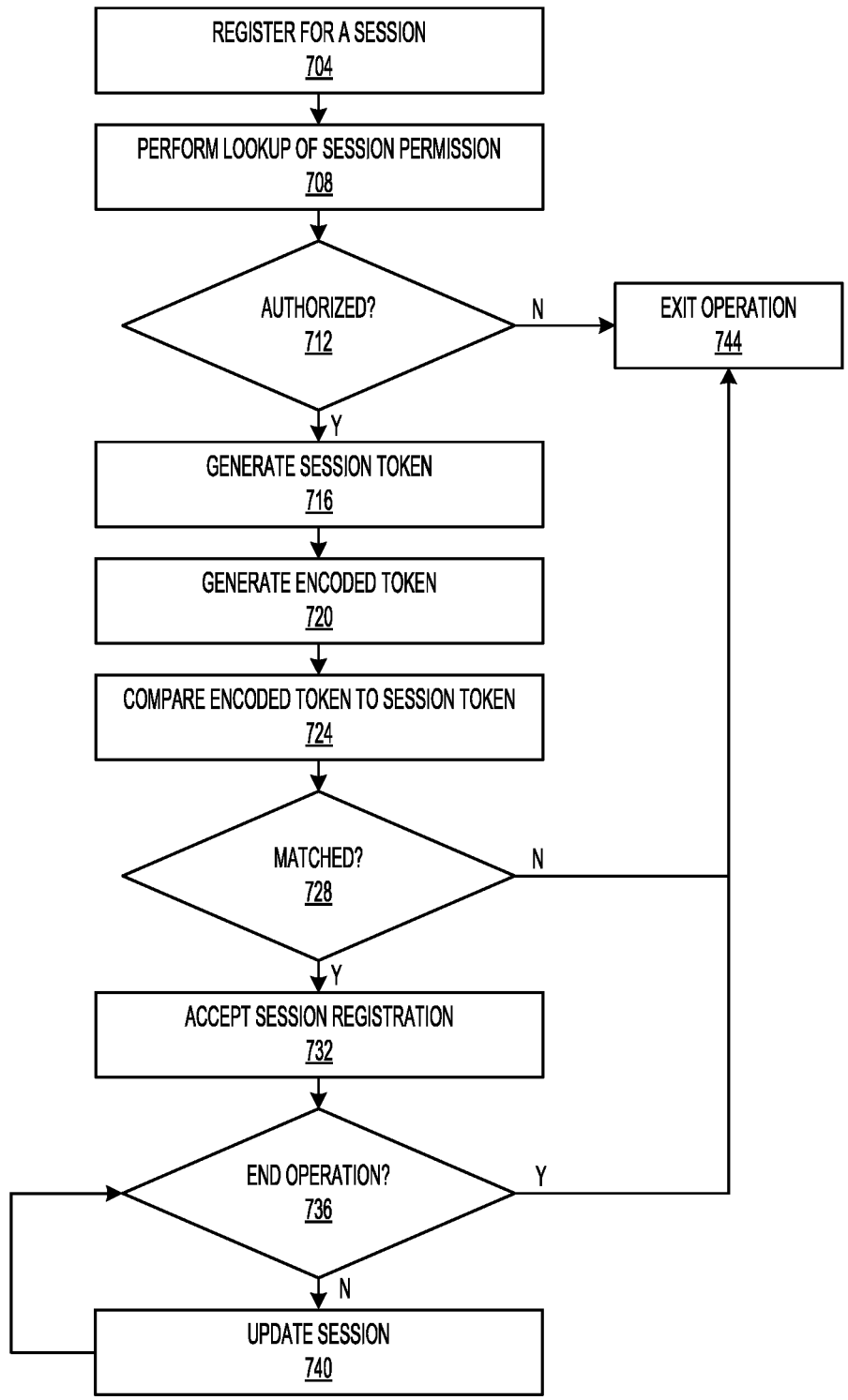
FIG. 7 illustrates an example flow diagram of a method for managing video conferences with breakout rooms, in accordance with one or more implementations.

FIG. 7 illustrates an example flow diagram of a method for managing video conferences with breakout rooms, in accordance with one or more implementations. The method 700 can be executed, performed, or otherwise carried out by one or more components of the system 200 (e.g., media server 201, network 202, client device 203, administrator device 204, or server 206), the computer system 100 described herein in conjunction with FIGS. 1A-1D, or any other computing devices described herein. In a brief overview of method 700, a client device can register for a session at step 704. At step 708, an access control server can perform a lookup of the session permission using session metadata retrieved from a database. At step 712, the access control server can determine whether the client device (e.g., the user of the client device) has permission to access the session. At step 716, the access control server can generate a session token (e.g., a first token). At step 720, a media server (e.g., media server 201, an SFU based server, etc.) can generate an encoded token (e.g., a second token). At step 724, the media server can compare the encoded token to the session token. At step 728, the media server can determine whether the token matched. At step 732, the media server can accept the session registration request from the client device. At step 736, the media server can determine whether to end an operation of the session. At step 740, the media server can send session updates to one or more participants in the session. At step 744, the media server can exit operation.

Still referring to FIG. 7 in further detail, at step 704, a client device can register for a session by sending a session registration request to an access server. The client device can be used by a student, an educator, or an administrator, respectively. For example, a student can log in to an account using the client device. Permission to access at least one session can vary based on the account type (e.g., student account, educator account, or an administrator account). For example, the student account or device can access one session at a time. The educator account (e.g., host) can manage multiple sessions and can access any session hosted by the educator. In some cases, the educator can merge on-going sessions, or request a merge with a session hosted by another educator, for example. The administrator account can access all on-going sessions within an institution, such as all sessions hosted by one or more educators of the institution. By registering for the session (e.g., through a media server), if accepted, the client device can send or receive media streams to or from the media server in at least one session.

At step 708, an access control server can retrieve session metadata from a remote database, such as the database of the access control server, and perform a lookup of the session permission using the session metadata. The access control server can retrieve the session metadata responsive to receiving the registration request for a session. The session metadata can be associated with the session being requested. The session metadata can include permission listing (e.g., a list of client devices or accounts permitted to access the session), among other background information of the session. Once the lookup is performed on the session metadata, the access control server can proceed to step 712.

At step 712, the access control server can determine whether the client device (e.g., the user of the client device) has permission to access the session. For example, the access control server can determine the client device or the account logged on using the client device is not in the session metadata (e.g., a permission listing). Therefore, the method 700 can proceed to step 744 to perform at least one exit operation. The access control server can determine that the client device is permitted to access the session based on the session metadata. The access control server can proceed to step 716 after determining that the client device is authorized to register.

At step 716, the access control server can generate a session token. For example, the access control server can compute a hash of the session metadata. The access control can use a session key stored in the remote database (e.g., on the access control server) to sign the computed hash to generate the session token. The session key can be shared with the media server. The session key can be referred to as a cryptographic key, secret key, or authorization key, for example. The session key may not be shared, exposed, visible, or retrievable by the client device (e.g., nor other client devices registering for a session). Once the session token has been generated, the access control server can send the session token to the client device. The access control server can send the session metadata along with the session token. The client device can forward the session token and the session metadata to the media server subsequent to the access control server accepting the registration request. Accordingly, the client device can proceed to confirm the registration request with the media server by proceeding to step 720.

At step 720, the media server can generate an encoded token. For example, the media server can receive the session token (e.g., generated by the access control server) and session metadata (e.g., retrieved by the access control server) forwarded by the client device. The media server can perform similar computation or features to the access control server to generate the encoded token. For example, the media server can compute/encode a hash (e.g., a second hash) of the session metadata received from the client device. The media server can sign the second hash with a cryptographic key stored in a data repository on the media server, thereby generating the encoded token. The cryptographic key can be the shared session key. Once the encoded token is generated, the media server can proceed to step 724.

At step 724, the media server can compare the encoded token to the session token. For example, the media server can compare the first hash of the session token to the second hash of the encoded token. The first hash can be of the session metadata retrieved from the remote database. The second hash can be of the session metadata received from the client device. The media server can compare the session key used to sign the first hash to the cryptographic key used to sign the second hash. In some cases, when signed with the key, the hash is converted into a token, which can include different formats, formulations of codes, or patterns of bits, for example. The media server can proceed to step 728 upon comparing the two tokens.

At step 728, the media server can determine whether the token matched. By determining whether the two tokens matched, the media server can confirm that the client device has permission to access the session requested. Further, the media server can confirm that the client device is ready to send or receive media streams to or from the session based on the streaming permission enabled/disabled for the client device. If the tokens matched, the media server can proceed to step 732. Otherwise, the media server can proceed to step 744 to perform at least one exit operation.

At step 732, the media server can accept the session registration request from the client device. For example, responsive to determining that the token from the client device matched with the encoded token generated at the media server, the media server can send an acknowledgment to the client device accepting the registration request. Once accepted, the media server can redirect the client device to the session on the application. In some cases, the media server can prompt the client device whether to join the session after acceptance. For example, the session registration process can differ from the client device attempting to join a session. In this case, the client device can perform an accessing operation to join the session as a participant. In another example, the registration request can be similar to a request to join the session. Thus, once accepted, the media server can redirect the client device to the session.

In some cases, the client device can be logged on to an educator account or an administrator account to access multiple parallel sessions. For example, the client device can send multiple session registration requests to one or more access control servers. The at least one access control server and the media server can confirm access permission of the client device. Once approved for the parallel sessions, the client device may not directly join a session. Instead, the client device can display a viewport with the accepted sessions. The viewport can include scrollable functionalities to view one or more frames associated with the respective one or more sessions. The frame can refer to a thumbnail, which can be updated at step 740. Therefore, the client device can be presented with multiple sessions without directly joining a session when at least one session registration request is accepted. The user of the client device can select a session to receive full read or write capabilities depending on the session settings or the type of account accessing the session.

At step 736, the media server can determine whether to end an operation. Ending an operation can refer to stopping the session update, terminating the session, terminating the application running the session, among others. The media server can determine to end an operation of an individual session or for all sessions accessed by the client device. The media server can determine to end an operation based on at least whether the session is timed out (e.g., session held for a time limit for a session, such as 10 hours, 20 hours, or 30 hours), an indication from the client device (e.g., click on an exit icon), idle time (e.g., if the user of the client device has not interacted with the client device for an extended period), among other indications sent by the client device or responsive to pre-configured application settings. If the media server determines to end the operation of at least one session, the media server can proceed to step 744. Otherwise, the media server can proceed to step 740 to update the session, among other operations to manage one or more sessions.

At step 740, the media server can send session updates or media streams to one or more participants in the session subsequent to the media server approving the session registration request. The update can include at least whiteboard events update. The media streams can include audio stream, video stream, or screen share stream. Each feed (e.g., whiteboard events or each media stream) can be separated and provided to one or more participants or observers by multiplexing the feeds. The media server can identify a subset of participants to provide media streams from a host. The subset of participants can include one or more participants from one of the sessions the host is managing. The subset can include one or more participants that are approved to access at least one session of the host. The subset can include one or more participants that, based on the configuration of each session, are allowed to receive at least one media stream from the host.

For example, the media server can identify that a first client device (e.g., a first student) is included in a first subgroup of client devices based on the session metadata. The first subgroup of client devices can be configured to receive one or more media streams streamed from the session host. Accordingly, after receiving a media stream (e.g., audio, video, or screen share stream) from a second client device (e.g., host or educator), the media server can forward the media stream to the first client device via a network interface connecting the media server with the client devices. The media server can forward the received media stream responsive to or shortly after (e.g., 100 ms, 200 ms, or 500 ms) identifying that the first client device is included in the first subgroup of client devices. Further, if the media server identifies a third client device (e.g., a second student or other participants in a session) as included in the first subgroup of client devices, the media server can forward the media stream to the third client device, among other client devices in the subgroup.

The media server or session update from one or more sessions can be sent to the administrator device. The administrator device can observe the sessions without being a participant. For example, the media server can determine that a session is in a viewport of the administrator device. Thus, the media server can provide the video stream, screen share stream, or whiteboard events update of the session to the administrator device. If the administrator device selects a session (e.g., at least one session in the viewport), the media server can provide at least one audio stream of the selected session to the administrator device. Further, based on whether a session is selected, the media server can provide a session update to the administrator device in real-time, responsive to the client device done editing on a whiteboard, or responsive to a time interval. For example, the administrator device (or educator device) can select a session and the media server can provide all whiteboard updates in real-time to the administrator device (e.g., every updated frame from the client device). For unselected sessions, the media server can provide a whiteboard update to the administrator device after a time interval, such as 500 ms, 1 second, among other pre-configured intervals. In further example, for unselected sessions, the media server can provide a whiteboard update to the administrator device responsive to a client device finishing a stroke or finish manipulating an object on the whiteboard of the session.

In some cases, the media server can receive media streams from each participant without sending the media stream to other participants. Instead, the media server can send the media stream from each participant of the session to the host. In this case, the first subgroup can refer to participants that only share media streams to one or more client devices of, for example, a second subgroup. For example, the media server can receive a media stream from each of the first client devices and the third client device. The media stream may not forward the media stream from the first client device to the third client device, and vice versa, from the third client device to the first client device. The media stream can identify that the second client device is in a second subgroup of client devices. Responsive to the identification, the media stream can forward the media stream from both the first client device and the third client device to the second client device hosting the session with the first client device and the third client device as participants, for example. The media server can determine other subgroups and send/receive configurations for each of the other subgroups, such as which subgroup to send or receive media streams to/from or which subgroup not to send or receive media streams to/from.

The media server can receive at least one command from one or more devices of a session. The command can include adjusting a user setting of the device issuing the command or other devices participating in the session. For example, the media server can receive a command from a second device. The command can indicate to reject media streams from a client device, such as the first client device. According to this command, the media server can transmit a response command (e.g., a second command) to the first client device to stop transmitting the media stream. For example, the media server can send a command to mute or disable other media streams at the client-side (e.g., the application running on the client device). Other commands can be issued by the host of the session to participants of the session. In some cases, the administrator of the institution can overwrite or send a command to the media server, which can adjust one or more settings of either the host or one or more participants in the session.

In some cases, the media stream from the first client device or the third client device (e.g., or other student devices) may not include a video stream. For example, the media server can receive an audio stream, screen share stream, or whiteboard events feed from a participant of the session without a video stream. The media stream may not receive other media streams from the participant. The media stream can receive different media streams from each participant based on whether the participant enabled video or other recording device or functions on their application or device.

The media server can receive multiple sets of media streams from various participants of the session simultaneously. The media server can send or forward a subset of media streams from one device to another, e.g., without sending a media stream back to the source. For example, the media server can receive a subset of media streams including a media stream from the first client device and a media stream from the second client device. The media server can forward the media stream from the second client device to the first client device without sending the media stream from the first client device back to the source (e.g., teacher streams to the student). The media stream can forward the media stream from the first client device to the second client device. In some cases, the media server can receive a media stream from the third client device without providing this media stream to the first client device. For example, the first client device can provide a media stream to other devices and only receive media streams from the host. For example, the media server can receive a second subset of media streams including a media stream from the first client device and a media stream from the second client device. The media server can transmit the second subset of media streams to the third client device. However, when the media server receives a third subset of media streams including a media stream from the second client device and a media stream from the third client device, for example, the media server can transmit the media stream from the second client device to the first client device without the media stream from the third client device.

The media server can continuously check whether there are new updates or changes to a session. In some cases, the media server can continuously receive and forward feeds and events from at least one client device to at least one other client device in the session. The media server can loop back to step 736 to determine if the operation should be ended, such as if the session is being terminated, or if no updates should be provided to at least one client device.

At step 744, the media server can exit an operation of at least the session or the application. The media server can terminate at least one operation executing on at least one session or the server. The exit operation can refer to ending the registered session. For example, the media server can terminate one or more sessions hosted by an educator based on a time out (e.g., a session has been on-going beyond a time limit), if the educator manually ends the session (e.g., click on the exit icon of at least a session), among others. In some cases, the exit operation can refer to ending a registration request process. For example, responsive to determining that the user is not permitted to access a requested session based on the session metadata, the access control server can send a notification to the client device indicating that the registration request is declined or that the client device (e.g., user account) is not permitted to access session. In some cases, the access control server can prompt the user to re-attempt the session registration request.

The media server can execute an exit operation responsive to mismatched tokens. For example, the media server can compare a session token to an encoded token. Responsive to determining that the tokens do not match, the media server can send a notification to the user that the user is not permitted to access the session or declined the session registration request from the client device. The media server or the access control server can send a command to the application running on the client device to provide a notification to the user.

In some cases, the exit operation can include stopping or ending the functionalities of the client device to receive or send a media stream to other devices in a session. For example, the host can send a command (e.g., setting configuration) to the media server to stop an audio stream, video stream, or screen share stream from the client device. Responsive to the command, the media server can disable stream sharing features on the client device (e.g., the application executing on the client device), such as muting microphones, terminating screen share, or disabling the camera. Thus, the method 700, along with at least features and functionalities of the systems and methods described in FIGS. 1-6, can enable hosts/moderators to observe a group or video collaboration, such as from parallel breakout groups simultaneously, and listen to audio from any group as an undetected observer or while actively participating in a single breakout group by automatically alerting the hosts/moderators based on visual cues from breakout group through media stream analysis.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML, page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating and formatting multiple teaching media, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method for managed video conferencing, comprising:
   receiving, by a media server from a first client device, metadata of a video conferencing session and a token, the token provided to the first client device by an access control server responsive to successful registration of the first client device for the video conferencing session;
   calculating a hash, by the media server, of the metadata with a cryptographic key shared with the access control server;
   comparing, by the media server, the calculated hash to the token; and
   responsive to the calculated hash matching the token, providing at least one media stream of the video conferencing session to the first client device;
   wherein providing the at least one media stream further comprises forwarding, to the first client device, a subset of media streams received by the media server, the subset including a media stream received from a second device and not including a media stream received from the first client device.

2. The method of claim 1, wherein the first client device has no access to the cryptographic key.

3. The method of claim 1, wherein providing the at least one media stream of the video conferencing session comprises:
   identifying, by the media server from the metadata, a first subgroup of a plurality of client devices as including the first client device;
   receiving, by the media server from a second client device, a first media stream; and
   forwarding, by the media server, the first media stream to the first client device, responsive to the identification of the first subgroup as including the first client device.

4. The method of claim 3, further comprising:
   identifying, by the media server from metadata received from a third client device, the first subgroup as including the third client device; and
   forwarding, by the media server, the first media stream to the third client device, responsive to the identification of the first subgroup as including the third client device.

5. The method of claim 4, wherein the media server receives a media stream from each of the first client device and the third client device, and does not forward the media stream from each of the first client device and the third client device to the other of the first client device and the third client device.

6. The method of claim 4, further comprising forwarding, by the media server, a media stream from each of the first client device and the third client device to the second client device, responsive to an identification of the second client device as included in a second subgroup of the plurality of client devices.

7. The method of claim 6, further comprising:
   receiving, by the media server from the second client device, a command to reject the media stream from the first client device; and
   responsive to receipt of the command to reject the media stream from the first client device, transmitting, by the media server to the first client device, a command to stop transmitting the media stream.

8. The method of claim 6, wherein at least one of the media streams from the first client device and the third client device does not include a video.

9. The method of claim 1, wherein the subset does not include a second media stream received from a third client device, and further comprising providing a second subset of media streams to the third client device, the second subset including the media stream received from the second device and the media stream received from the first client device.

10. A system for managed video conferencing, comprising:
    a media server comprising a processor, a network interface in communication with a plurality of client devices, and a memory storing a cryptographic key shared with an access control server;
    wherein the processor is configured to:
    receive, from a first client device via the network interface, metadata of a video conferencing session and a token, the token provided to the first client device by the access control server responsive to successful registration of the first client device for the video conferencing session, calculate a hash of the metadata with the cryptographic key, compare the calculated hash to the token, responsive to the calculated hash matching the token, provide at least one media stream of the video conferencing session to the first client device, identify, from the metadata, a first subgroup of the plurality of client devices as including the first client device;
    receive, via the network interface from a second client device, a first media stream, and forward, via the network interface, the first media stream to the first client device, responsive to the identification of the first subgroup as including the first client device.

11. The system of claim 10, wherein the first client device has no access to the cryptographic key.

12. The system of claim 11, wherein the processor is further configured to:
    identify, from metadata received from a third client device, the first subgroup as including the third client device; and
    forward the first media stream to the third client device, responsive to the identification of the first subgroup as including the third client device.

13. The system of claim 12, wherein the media server receives a media stream from each of the first client device and the third client device, and does not forward the media stream from each of the first client device and the third client device to the other of the first client device and the third client device.

14. The system of claim 12, wherein the processor is further configured to forward a media stream from each of the first client device and the third client device to the second client device, responsive to an identification of the second client device as included in a second subgroup of the plurality of client devices.

15. The system of claim 14, wherein the processor is further configured to:
    receive, via the network interface from the second client device, a command to reject the media stream from the first client device; and
    responsive to receipt of the command to reject the media stream from the first client device, transmit, via the network interface to the first client device, a command to stop transmitting the media stream.

16. The system of claim 14, wherein at least one of the media streams from the first client device and the third client device does not include a video.

17. A system for managed video conferencing, comprising:
- a media server comprising a processor, a network interface in communication with a plurality of client devices, and a memory storing a cryptographic key shared with an access control server:
- wherein the processor is configured to:
  - receive, from a first client device via the network interface, metadata of a video conferencing session and a token, the token provided to the first client device by the access control server responsive to successful registration of the first client device for the video conferencing session,
  - calculate a hash of the metadata with the cryptographic key,
  - compare the calculated hash to the token, and responsive to the calculated hash matching the token, provide at least one media stream of the video conferencing session to the first client device;
- wherein the processor is further configured to forward, to the first client device, a subset of media streams received by the media server, the subset including a media stream received from a second device and not including a media stream received from the first client device.

18. The system of claim 17, wherein the subset does not include a second media stream received from a third client device, and wherein the processor is further configured to provide a second subset of media streams to the third client device, the second subset including the media stream received from the second device and the media stream received from the first client device.

* * * * *